(12) United States Patent
Jang

(10) Patent No.: US 12,287,030 B2
(45) Date of Patent: Apr. 29, 2025

(54) PLANETARY GEAR DEVICE

(71) Applicant: Soon Gil Jang, Seoul (KR)

(72) Inventor: Soon Gil Jang, Seoul (KR)

( * ) Notice: Subject to any disclaimer, the term of this patent is extended or adjusted under 35 U.S.C. 154(b) by 0 days.

(21) Appl. No.: 18/347,208

(22) Filed: Jul. 5, 2023

(65) Prior Publication Data

US 2023/0383829 A1 Nov. 30, 2023

Related U.S. Application Data

(63) Continuation of application No. PCT/KR2021/019975, filed on Dec. 28, 2021.

(30) Foreign Application Priority Data

Jan. 14, 2021 (KR) .................. 10-2021-0004975
Dec. 28, 2021 (KR) .................. 10-2021-0189077

(51) Int. Cl.
*F16H 48/10* (2012.01)
*F16H 48/285* (2012.01)

(52) U.S. Cl.
CPC ........... *F16H 48/285* (2013.01); *F16H 48/10* (2013.01); *F16H 2048/106* (2013.01)

(58) Field of Classification Search
CPC .. F16H 48/285; F16H 48/10; F16H 2048/106; F16H 48/08; F16H 48/05; F16H 2048/02; F16H 2048/104; F16H 57/08
See application file for complete search history.

(56) References Cited

U.S. PATENT DOCUMENTS

| | | | | |
|---|---|---|---|---|
| 634,827 A | * | 10/1899 | Mees | F16H 48/08 475/205 |
| 675,620 A | * | 6/1901 | Buffum | F16H 48/08 475/205 |
| 1,954,686 A | * | 4/1934 | Stickney | F16H 3/64 475/330 |
| 1,964,956 A | * | 7/1934 | Lincoln | F16H 48/08 475/201 |
| 7,303,497 B1 | * | 12/2007 | Wige | F16H 35/008 475/248 |
| 2004/0018909 A1 | | 1/2004 | Hwa et al. | |
| 2006/0089227 A1 | | 4/2006 | Fanselow et al. | |

FOREIGN PATENT DOCUMENTS

| | | | | |
|---|---|---|---|---|
| CN | 108412981 A | * | 8/2018 | ............... F16H 3/44 |
| CN | 208793532 U | * | 4/2019 | ............... F16H 3/44 |
| CN | 108413003 B | * | 10/2020 | ............ F16H 48/05 |
| EP | 0711389 B1 | | 5/1996 | |
| JP | 61-133424 U | | 8/1986 | |
| JP | 02-066345 A | | 3/1990 | |
| JP | 2010-101338 A | | 5/2010 | |
| KR | 10-2006-0049993 A | | 5/2006 | |
| KR | 10-2019-0105029 A | | 9/2019 | |

* cited by examiner

*Primary Examiner* — Tisha D Lewis

(74) *Attorney, Agent, or Firm* — NKL Law; Jae Youn Kim

(57) ABSTRACT

A planetary gear device having four or more shafts is provided. The planetary gear device may be expanded by adding another planetary gear device to the planetary gear device in the related art, all shafts of the planetary gear device are exposed to the outside such that a brake may be easily installed, and the shafts may be divided into two groups and separated. The planetary gear device may be used for an apparatus for connecting, braking, and separating an automatic transmission, a plurality of power supplying shafts, and a plurality of power receiving shafts and used to integrate two apparatuses.

7 Claims, 14 Drawing Sheets

PLANETARY GEAR DEVICE

BACKGROUND

Technical Field

A planetary gear device refers to a gear device including one gear, and another gear disposed around one gear and configured to rotate while engaging with another gear. The planetary gear device is used in various fields such as a differential gear device and an automatic transmission of a vehicle. There are many different uses of the planetary gear device, and thus the planetary gear device has various detailed functions and various shapes.

The planetary gear device, which is often used for the automatic transmission, is configured such that planet gears, which are each provided in the form of a spur gear, rotate around a sun gear while engaging with the sun gear, a ring gear rotates while engaging with outer portions of the planet gears, and the planet gears are installed on a carrier.

The planetary gear device, which is often used for a differential gear device, is configured such that planet gears, which are differential pinions each provided in the form of a bevel gear, rotate around two sun gears, which are differential side gears each provided in the form of a bevel gear, while engaging with the two sun gears. The differential pinion is installed on a carrier called a differential casing. Hereinafter, the differential casing will be referred to as a 'differential carrier' or 'carrier'.

The planet gear of the planetary gear device, which is used for the automatic transmission, and the differential pinion of the planetary gear device, which is used for the differential gear device, are planet gears that may simultaneously rotate and revolve.

Background Art

The planetary gear device in the related art has three shafts capable of being connected to one another. The three shafts are a sun gear shaft, a ring gear shaft, and a carrier shaft in the case of the planetary gear device used for the automatic transmission. The three shafts are shafts of the two differential side gears and a driving shaft for rotating the differential pinion in the case of the planetary gear device used for the differential gear device.

In the case of the automatic transmission, there is a tendency to slowly perform a shift operation by dividing a shift stage into several steps. To satisfy the tendency, there is a tendency to use an increasingly large number of planetary gear devices for the single automatic transmission. Therefore, it is possible to reduce a required number of planetary gear devices when the planetary gear device, in which four or more shafts may be connected to one another and used, is provided.

Recently, in a vehicle, an internal combustion engine, an electric generator, an electric motor, a regenerative braking generator, and a driving shaft may be connected together. Therefore, it is necessary to freely add a rotational force generated by the internal combustion engine, the electric motor, and the driving shaft and freely transmit the added rotational force to the electric generator, the regenerative braking generator, and the driving shaft or brake the electric generator, the regenerative braking generator, and the driving shaft. In addition, it is necessary to divide the connected shafts into two groups and separate the connected shafts. The planetary gear device may be integrated with the transmission depending on the number of shafts.

Therefore, it will be convenient in case that the planetary gear device, in which four or more shafts may be connected to one another and used, power may be applied to the shafts, and the shafts may be braked and separated.

SUMMARY OF THE INVENTION

An object to be achieved by the present invention is to provide a planetary gear device in which four or more shafts may be connected to one another and used.

The planetary gear device may use concentric hollow shafts, the shaft, a gear connected to the shaft, or a part connected to the gear may be exposed to the outside to install a brake, and the shafts may be divided into two groups so that the power and the rotation may be separated.

A plurality of planetary gear devices in the related art and a plurality of differential gear devices in the related art are interchangeably used, and a concentric hollow shaft, a disc, a cylinder, a wheel, and a ring are used to ensure a space in which a brake may be installed.

The planetary gear device according to the present invention, in which the four or more shafts may be connected to each other and used, is applied to the automatic transmission, such that the single planetary gear device may implement a combination of a plurality of rotational forces, which makes it possible to implement a large number of shift stages even though a small number of planetary gear devices is adopted.

In addition, in the case of a hybrid vehicle, it is necessary to connect a plurality of power supplying devices and a plurality of power receiving devices, brake some of the connected devices, or divide the connected devices into two groups and separate the connected devices. This problem may be simply solved by using the planetary gear device according to the present invention in which the four or more shafts may be connected to one another, and the devices and the transmission may be integrated into a single configuration.

DETAILED DESCRIPTION

Figure 1:
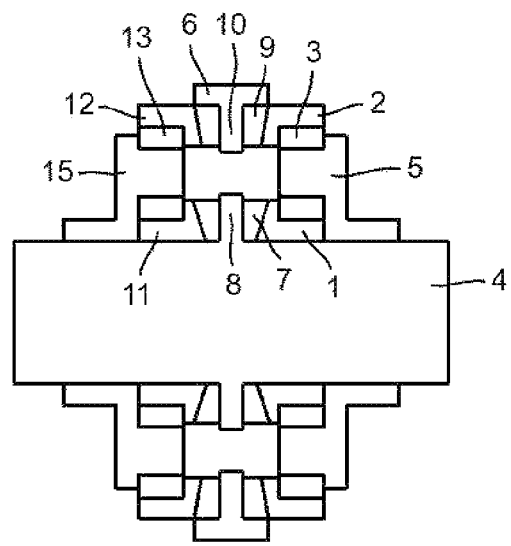
FIG. 1 illustrates a four-axis planetary gear device.

FIG. 1 briefly illustrates a cross-section of a four-axis planetary gear device configured to be assembling a first sun double-sided gear 1, a first ring double-sided gear 2, a first planet gear 3, a sun carrier shaft 4, a first carrier 5, a ring 6, a sun pinion 7, a sun protrusion shaft 8, a ring pinion 9, a ring protrusion shaft 10, a second sun double-sided gear 11, a second ring double-sided gear 12, a second planet gear 13, and a second carrier 15. The two carriers 5 and 15 are respectively illustrated as having hollow shafts, but the ring 6 is not illustrated as having a hollow shaft in the same way. The ring 6 has a gear formed on an outer portion thereof and implements gear connection. The ring 6 is omitted because a brake is often installed, but the ring 6 is not a component that needs to be eliminated. As necessary, the ring 6 may be configured to have a hollow shaft.

Figure 2:
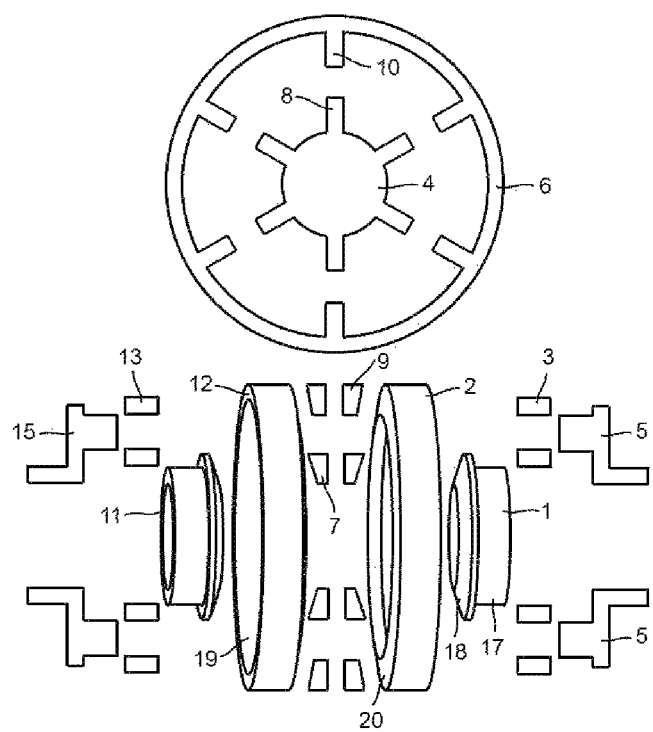
FIG. 2 illustrates a cross-sectional view of one part of the disassembled four-axis planetary gear device.

FIG. 2 illustrates a cross-sectional view of one part of the disassembled four-axis planetary gear device illustrated in FIG. 1 and illustrates a perspective view of another part of the disassembled four-axis planetary gear device.

The sun protrusion shaft 8 is provided in the form of a protrusion at a periphery of the sun carrier shaft 4, and the sun pinion 7 is installed on the sun protrusion shaft 8. The number of sun protrusion shafts 8 and the number of sun pinions 7 are not limited. The first sun double-sided gear 1 and the second sun double-sided gear 11, which engage with two opposite sides of the sun pinion 7, are installed on the sun carrier shaft 4 so as to idle.

The ring protrusion shaft 10 is provided in the form of a protrusion at an inner periphery of the ring 6, and the ring pinion 9 is installed on the ring protrusion shaft 10. The number of ring protrusion shafts 10 and the number of ring pinions 9 are not limited. The first ring double-sided gear 2 and the second ring double-sided gear 12 engage with two opposite sides of the ring pinion 9.

The first planet gear 3 is installed on the first carrier 5, and the second planet gear 13 is installed on the second carrier 15. The number of planet gears 3 and 13 respectively installed on the carriers 5 and 15 is not limited. One side of the first planet gear 3 engages with the first sun double-sided gear 1, and the other side of the first planet gear 3 engages with the first ring double-sided gear 2. One side of the second planet gear 13 engages with the second sun double-sided gear 11, and the other side of the second planet gear 13 engages with the second ring double-sided gear 12.

Gear teeth are omitted without being illustrated. The gear teeth, which are omitted from the drawings, are gear teeth provided on outer portions of the first planet gear 3, the second planet gear 13, the sun pinion 7, and the ring pinion 9, gear teeth provided on a portion 17 of an outer portion of the first sun double-sided gear 1 engaging with the first planet gear 3, gear teeth provided on a portion 18 of the outer portion of the first sun double-sided gear 1 engaging with the sun pinion 7, gear teeth provided on a portion of an outer portion of the second sun double-sided gear 11 engaging with the second planet gear 13, gear teeth provided on a portion of the outer portion of the second sun double-sided gear 11 engaging with the sun pinion 7, gear teeth provided on a portion of an inner portion of the first ring double-sided gear 2 engaging with the first planet gear 3, gear teeth provided on a portion 20 of an outer portion of the first ring double-sided gear 2 engaging with the ring pinion 9, gear teeth provided on a portion 19 of an inner portion of the second ring double-sided gear 12 engaging with the second planet gear 13, and gear teeth provided on a portion of an outer portion of the second ring double-sided gear 12 engaging with the ring pinion 9.

A relationship between the components, which are in contact with each other but idle, is implemented between the first sun double-sided gear 1 and the sun carrier shaft 4, between the second sun double-sided gear 11 and the sun carrier shaft 4, between the shaft of the first carrier 5 and the sun carrier shaft 4, and between the shaft of the second carrier 15 and the sun carrier shaft 4.

Figure 3:
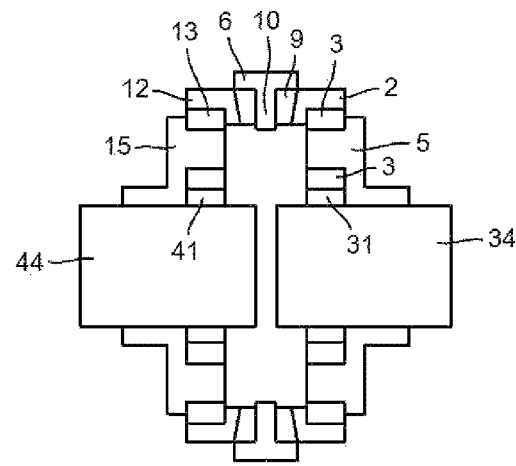
FIG. 3 illustrates a cross-section of a five-axis planetary gear device.

FIG. 3 briefly illustrates a cross-section of a five-axis planetary gear device configured by assembling a first sun gear 31, the first ring double-sided gear 2, the first planet gear 3, the first carrier 5, the ring 6, the ring pinion 9, the ring protrusion shaft 10, a first sun gear shaft 34, a second sun gear 41, the second ring double-sided gear 12, the second planet gear 13, the second carrier 15, and a second sun gear shaft 44. The two carriers 5 and 15 are respectively illustrated as having hollow shafts, but the ring 6 is not illustrated as having a hollow shaft in the same way. The ring 6 has a gear formed on an outer portion thereof and implements gear connection. The ring 6 is omitted because a brake is often installed, but the ring 6 is not a component that needs to be eliminated. As necessary, the ring 6 may be configured to have a hollow shaft.

Figure 4:
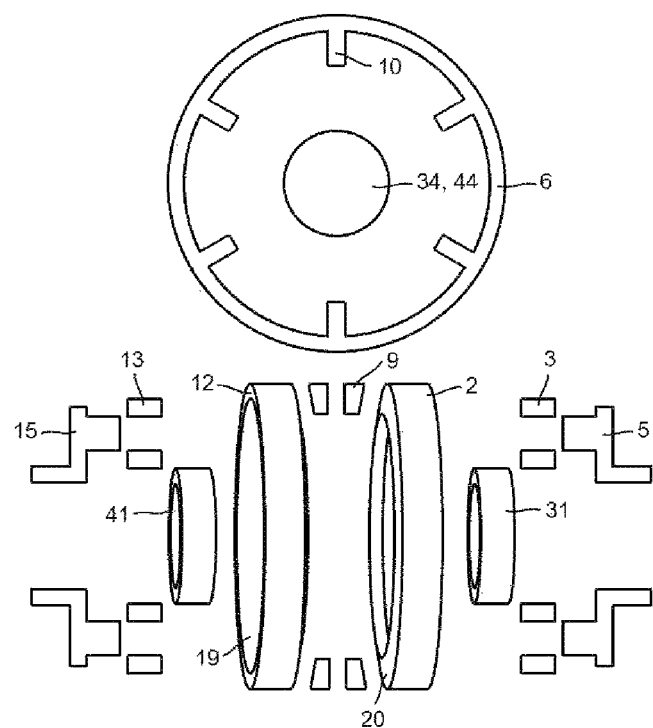
FIG. 4 illustrates a cross-sectional and perspective view of one part of the disassembled five-axis planetary gear device.

FIG. 4 illustrates a cross-sectional view of one part of the disassembled five-axis planetary gear device illustrated in FIG. 3 and illustrates a perspective view of another part of the disassembled five-axis planetary gear device.

The first sun gear 31 is installed on the first sun gear shaft 34 so as not to idle, and the second sun gear 41 is installed on the second sun gear shaft 44 so as not to idle.

The ring protrusion shaft 10 is provided in the form of a protrusion at an inner periphery of the ring 6, and the ring pinion 9 is installed on the ring protrusion shaft 10. The number of ring protrusion shafts 10 and the number of ring pinions 9 are not limited. The first ring double-sided gear 2 and the second ring double-sided gear 12 engage with two opposite sides of the ring pinion 9.

The first planet gear 3 is installed on the first carrier 5, and the second planet gear 13 is installed on the second carrier 15. The number of planet gears 3 and 13 respectively installed on the carriers 5 and 15 is not limited. One side of the first planet gear 3 engages with the first sun gear 31, and the other side of the first planet gear 3 engages with the first ring double-sided gear 2. One side of the second planet gear 13 engages with the second sun gear 41, and the other side of the second planet gear 13 engages with the second ring double-sided gear 12.

Gear teeth are omitted without being illustrated. The gear teeth, which are omitted from the drawings, are gear teeth provided on the outer portions of the first planet gear 3, the second planet gear 13, and the ring pinion 9, gear teeth provided on the portion of the outer portion of the first sun gear 31 engaging with the first planet gear 3, gear teeth provided on the portion of the outer portion of the second sun gear 41 engaging with the second planet gear 13, gear teeth provided on the portion of the inner portion of the first ring double-sided gear 2 engaging with the first planet gear 3, gear teeth provided on the portion 20 of the outer portion of the first ring double-sided gear 2 engaging with the ring pinion 9, gear teeth provided on the portion 19 of the inner portion of the second ring double-sided gear 12 engaging with the second planet gear 13, and gear teeth provided on the portion of the outer portion of the second ring double-sided gear 12 engaging with the ring pinion 9.

A relationship between the components, which are in contact with each other but idle, is implemented between the shaft of the first carrier 5 and the first sun gear shaft 34 and between the shaft of the second carrier 15 and the second sun gear shaft 44. The first sun gear 31 and the first sun gear shaft 34 do not idle relative to each other, and the second sun gear 41 and the second sun gear shaft 44 do not idle relative to each other.

Figure 5:
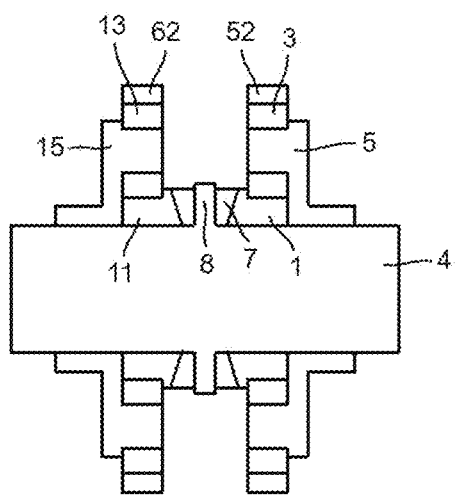
FIG. 5 illustrates a cross-section of a five-axis planetary gear device.

FIG. 5 briefly illustrates a cross-section of a five-axis planetary gear device configured by assembling the first sun double-sided gear 1, the first planet gear 3, the sun carrier shaft 4, the first carrier 5, the sun pinion 7, the sun protrusion shaft 8, the second sun double-sided gear 11, the second planet gear 13, the second carrier 15, a first ring gear 52, and a second ring gear 62. The two carriers 5 and 15 are respectively illustrated as having hollow shafts, but the two ring gears 52 and 62 are not illustrated as having hollow shafts in the same way. The two ring gears 52 and 62 each have a gear formed on an outer portion thereof and implements gear connection. The two ring gears 52 and 62 are omitted because a brake is often installed, but the two ring gears 52 and 62 are not components that need to be eliminated. As necessary, the two ring gears 52 and 62 may each be configured as a shaft.

Figure 6:
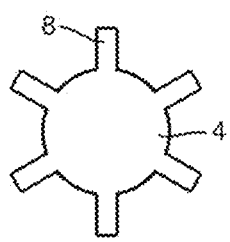
FIG. 6 illustrates a cross-sectional and perspective view of one part of the disassembled five-axis planetary gear device.
Figure 6:
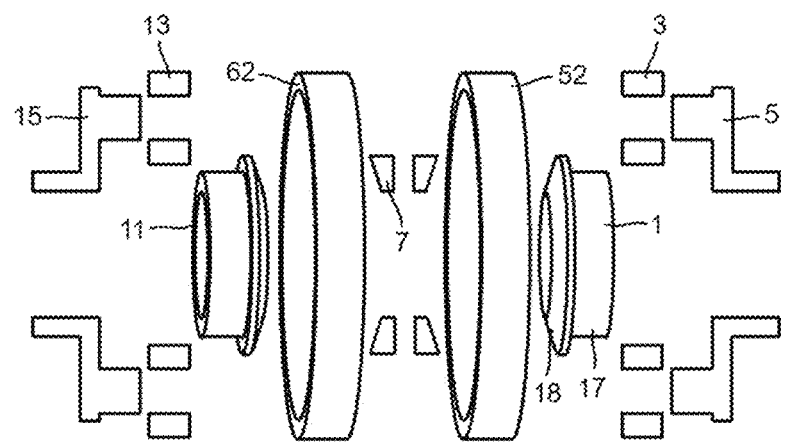

FIG. 6 illustrates a cross-sectional view of one part of the disassembled five-axis planetary gear device illustrated in FIG. 5 and illustrates a perspective view of another part of the disassembled five-axis planetary gear device.

The sun protrusion shaft 8 is provided in the form of a protrusion at a periphery of the sun carrier shaft 4, and the sun pinion 7 is installed on the sun protrusion shaft 8. The number of sun protrusion shafts 8 and the number of sun pinions 7 are not limited. The first sun double-sided gear 1 and the second sun double-sided gear 11, which engage with two opposite sides of the sun pinion 7, are installed on the sun carrier shaft 4 so as to idle.

The first planet gear 3 is installed on the first carrier 5, and the second planet gear 13 is installed on the second carrier 15. The number of planet gears 3 and 13 respectively installed on the carriers 5 and 15 is not limited. One side of the first planet gear 3 engages with the first sun double-sided gear 1, and the other side of the first planet gear 3 engages with the first ring gear 52. One side of the second planet gear 13 engages with the second sun double-sided gear 11, and the other side of the second planet gear 13 engages with the second ring gear 62.

Gear teeth are omitted without being illustrated. The gear teeth, which are omitted from the drawings, are gear teeth provided on the outer portions of the first planet gear 3, the second planet gear 13, and the sun pinion 7, gear teeth provided on the portion 17 of the outer portion of the first sun double-sided gear 1 engaging with the first planet gear 3, gear teeth provided on the portion 18 of the outer portion of the first sun double-sided gear 1 engaging with the sun pinion 7, gear teeth provided on the portion of the outer portion of the second sun double-sided gear 11 engaging with the second planet gear 13, gear teeth provided on the portion of the outer portion of the second sun double-sided gear 11 engaging with the sun pinion 7, gear teeth provided on the portion of the inner portion of the first ring gear 52 engaging with the first planet gear 3, and gear teeth provided on the portion of the inner portion of the second ring gear 62 engaging with the second planet gear 13.

A relationship between the components, which are in contact with each other but idle, is implemented between the first sun double-sided gear 1 and the sun carrier shaft 4, between the second sun double-sided gear 11 and the sun carrier shaft 4, between the shaft of the first carrier 5 and the sun carrier shaft 4, and between the shaft of the second carrier 15 and the sun carrier shaft 4.

Figure 7:
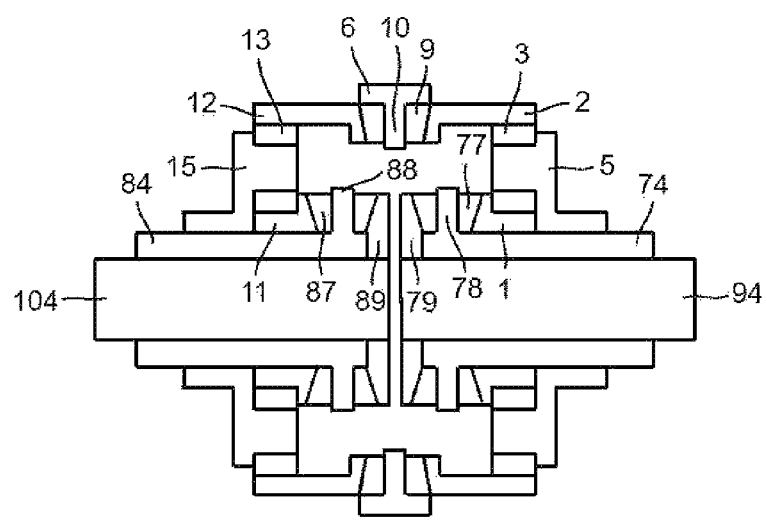
FIG. 7 is a view that illustrates a cross-section of a seven-axis planetary gear device.

FIG. 7 briefly illustrates a cross-section of a seven-axis planetary gear device configured by assembling the first sun double-sided gear 1, the first ring double-sided gear 2, the first planet gear 3, the first carrier 5, the ring 6, the ring pinion 9, the ring protrusion shaft 10, a third sun carrier shaft 74, a third sun pinion 77, a third sun protrusion shaft 78, a third differential side bevel gear 79, a third differential side bevel gear shaft 94, the second sun double-sided gear 11, the second ring double-sided gear 12, the second planet gear 13, the second carrier 15, a fourth sun carrier shaft 84, a fourth sun pinion 87, a fourth sun protrusion shaft 88, a fourth differential side bevel gear 89, and a fourth differential side bevel gear shaft 104. The two carriers 5 and 15 are respectively illustrated as having hollow shafts, but the ring 6 is not illustrated as having a hollow shaft in the same way. The ring 6 has a gear formed on an outer portion thereof and implements gear connection. The ring 6 is omitted because a brake is often installed, but the ring 6 is not a component that needs to be eliminated. As necessary, the ring 6 may be configured to have a hollow shaft.

Figure 8:
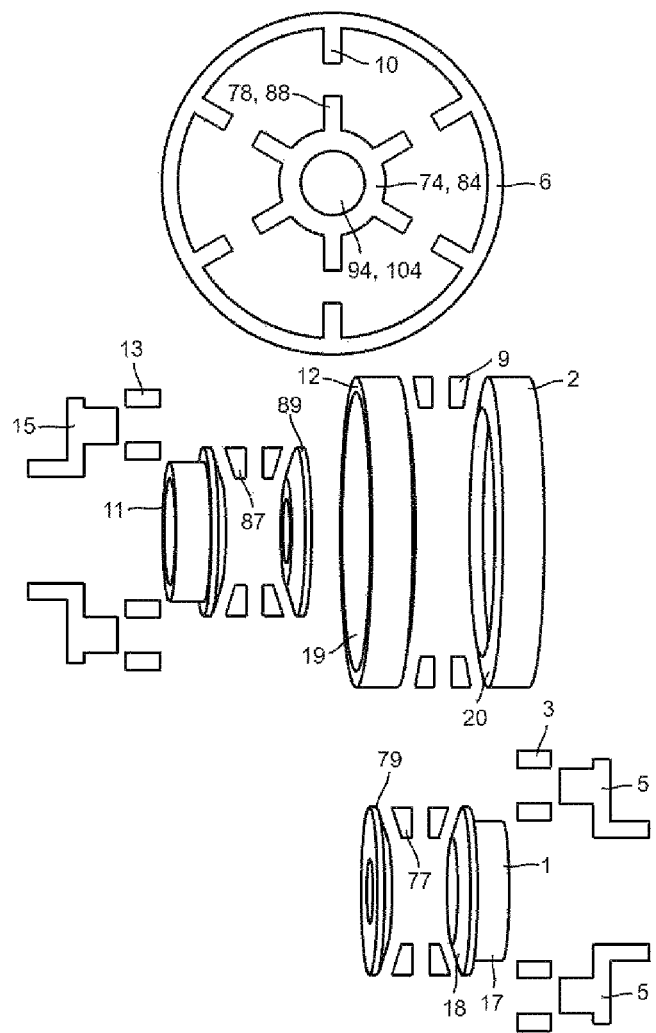
FIG. 8 illustrates a cross-sectional and perspective view of one part of the disassembled seven-axis planetary gear device.

FIG. 8 illustrates a cross-sectional view of one part of the disassembled seven-axis planetary gear device illustrated in FIG. 7 and illustrates a perspective view of another part of the disassembled seven-axis planetary gear device.

The third sun protrusion shaft 78 is provided in the form of a protrusion at a periphery of the third sun carrier shaft 74, and the third sun pinion 77 is installed on the third sun protrusion shaft 78. The number of third sun protrusion shafts 78 and the number of third sun pinions 77 are not limited. The first sun double-sided gear 1 and the third differential side bevel gear 79 engage with two opposite sides of the third sun pinion 77. The first sun double-sided gear 1 is installed on the third sun carrier shaft 74 so as to idle. The third sun carrier shaft 74 is installed on the third differential side bevel gear shaft 94 so as to idle. The third differential side bevel gear 79 is installed on the third differential side bevel gear shaft 94 so as not to idle.

The fourth sun protrusion shaft 88 is provided in the form of a protrusion at a periphery of the fourth sun carrier shaft 84, and the fourth sun pinion 87 is installed on the fourth sun protrusion shaft 88. The number of fourth sun protrusion shafts 88 and the number of fourth sun pinions 87 are not limited. The second sun double-sided gear 11 and the fourth differential side bevel gear 89 engage with two opposite sides of the fourth sun pinion 87. The second sun double-sided gear 11 is installed on the fourth sun carrier shaft 84 so as to idle. The fourth sun carrier shaft 84 is installed on the fourth differential side bevel gear shaft 104 so as to idle. The fourth differential side bevel gear 89 is installed on the fourth differential side bevel gear shaft 104 so as not to idle.

The ring protrusion shaft 10 is provided in the form of a protrusion at an inner periphery of the ring 6, and the ring pinion 9 is installed on the ring protrusion shaft 10. The number of ring protrusion shafts 10 and the number of ring pinions 9 are not limited. The first ring double-sided gear 2 and the second ring double-sided gear 12 engage with two opposite sides of the ring pinion 9.

The first planet gear 3 is installed on the first carrier 5, and the second planet gear 13 is installed on the second carrier 15. The number of planet gears 3 and 13 respectively installed on the carriers 5 and 15 is not limited. One side of the first planet gear 3 engages with the first sun double-sided gear 1, and the other side of the first planet gear 3 engages with the first ring double-sided gear 2. One side of the second planet gear 13 engages with the second sun double-sided gear 11, and the other side of the second planet gear 13 engages with the second ring double-sided gear 12.

Gear teeth are omitted without being illustrated. The gear teeth, which are omitted from the drawings, are gear teeth provided on outer portions of the first planet gear 3, the second planet gear 13, the ring pinion 9, the sun bevel gears 77 and 87, and the differential side bevel gears 79 and 89, gear teeth provided on the portion 17 of the outer portion of the first sun double-sided gear 1 engaging with the first planet gear 3, gear teeth provided on the portion 18 of the outer portion of the first sun double-sided gear 1 engaging with the third sun pinion 77, gear teeth provided on the portion of the outer portion of the second sun double-sided gear 11 engaging with the second planet gear 13, gear teeth provided on the portion of the outer portion of the second sun double-sided gear 11 engaging with the fourth sun pinion 87, gear teeth provided on the portion of the inner portion of the first ring double-sided gear 2 engaging with the first planet gear 3, gear teeth provided on the portion 20 of the outer portion of the first ring double-sided gear 2 engaging with the ring pinion 9, gear teeth provided on the portion 19 of the inner portion of the second ring double-sided gear 12 engaging with the second planet gear 13, and gear teeth provided on the portion of the outer portion of the second ring double-sided gear 12 engaging with the ring pinion 9.

A relationship between the components, which idle, is implemented between the first sun double-sided gear 1 and the third sun carrier shaft 74, between the second sun double-sided gear 11 and the fourth sun carrier shaft 84, between the shaft of the first carrier 5 and the third sun carrier shaft 74, between the shaft of the second carrier 15 and the fourth sun carrier shaft 84, between the third sun carrier shaft 74 and the third differential side bevel gear shaft 94, and between the fourth sun carrier shaft 84 and the fourth differential side bevel gear shaft 104. A relationship between the components, which do not idle, is implemented between the third differential side bevel gear 79 and the third differential side bevel gear shaft 94 and between the fourth differential side bevel gear 89 and the fourth differential side bevel gear shaft 104.

Figure 9:
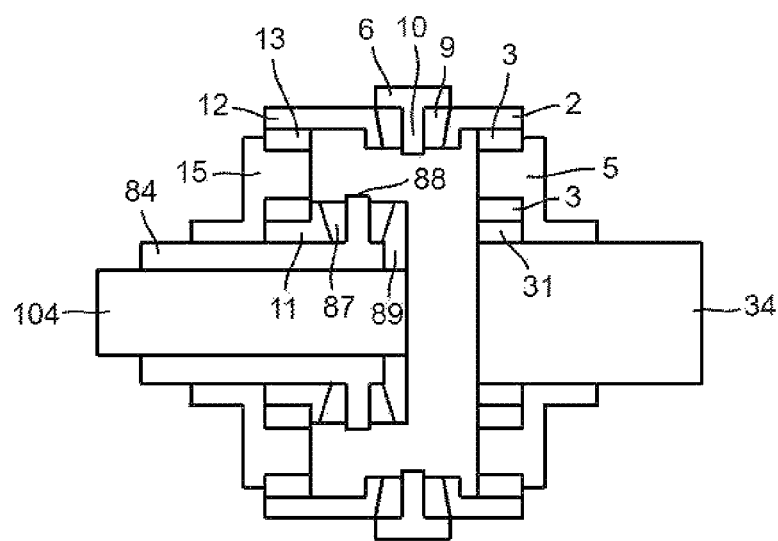
FIG. 9 illustrates a view of a cross-section of a six-axis planetary gear device.

FIG. 9 briefly illustrates a cross-section of a six-axis planetary gear device configured by assembling the first ring double-sided gear 2, the first planet gear 3, the first carrier 5, the ring 6, the ring pinion 9, the ring protrusion shaft 10, the first sun gear shaft 34, the first sun gear 31, the second sun double-sided gear 11, the second ring double-sided gear 12, the second planet gear 13, the second carrier 15, the fourth sun carrier shaft 84, the fourth sun pinion 87, the fourth sun protrusion shaft 88, the fourth differential side bevel gear 89, and the fourth differential side bevel gear shaft 104. The two carriers 5 and 15 are respectively illustrated as having hollow shafts, but the ring 6 is not illustrated as having a hollow shaft in the same way. The ring 6 has a gear formed on an outer portion thereof and implements gear connection. The ring 6 is omitted because a brake is often installed, but the ring 6 is not a component that needs to be eliminated. As necessary, the ring 6 may be configured to have a hollow shaft.

Figure 10:
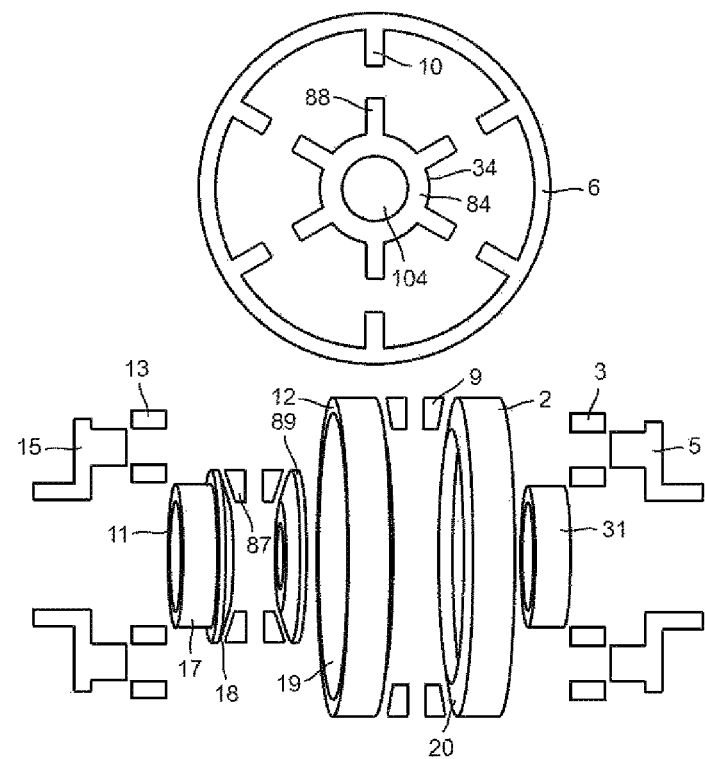
FIG. 10 illustrates a cross-sectional and perspective view of one part of the disassembled six-axis planetary gear device.

FIG. 10 illustrates a cross-sectional view of one part of the disassembled six-axis planetary gear device illustrated in FIG. 9 and illustrates a perspective view of another part of the disassembled six-axis planetary gear device.

The first sun gear 31 is installed on the first sun gear shaft 34 so as not to idle, the fourth sun protrusion shaft 88 is provided in the form of a protrusion at a periphery of the fourth sun carrier shaft 84, and the fourth sun pinion 87 is installed on the fourth sun protrusion shaft 88. The number of fourth sun protrusion shafts 88 and the number of fourth sun pinions 87 are not limited. The second sun double-sided gear 11 and the fourth differential side bevel gear 89 engage with two opposite sides of the fourth sun pinion 87. The second sun double-sided gear 11 is installed on the fourth sun carrier shaft 84 so as to idle. The fourth sun carrier shaft 84 is installed on the fourth differential side bevel gear shaft 104 so as to idle. The fourth differential side bevel gear 89 is installed on the fourth differential side bevel gear shaft 104 so as not to idle.

The ring protrusion shaft 10 is provided in the form of a protrusion at an inner periphery of the ring 6, and the ring pinion 9 is installed on the ring protrusion shaft 10. The number of ring protrusion shafts 10 and the number of ring pinions 9 are not limited. The first ring double-sided gear 2 and the second ring double-sided gear 12 engage with two opposite sides of the ring pinion 9.

The first planet gear 3 is installed on the first carrier 5, and the second planet gear 13 is installed on the second carrier 15. The number of planet gears 3 and 13 respectively installed on the carriers 5 and 15 is not limited. One side of the first planet gear 3 engages with the first sun gear 31, and the other side of the first planet gear 3 engages with the first ring double-sided gear 2. One side of the second planet gear 13 engages with the second sun double-sided gear 11, and the other side of the second planet gear 13 engages with the second ring double-sided gear 12.

Gear teeth are omitted without being illustrated. The gear teeth, which are omitted from the drawings, are gear teeth provided on outer portions of the first planet gear 3, the second planet gear 13, the ring pinion 9, the fourth sun pinion 87, and the fourth differential side bevel gear 89, gear teeth provided on the portion of the outer portion of the first sun gear 31 engaging with the first planet gear 3, gear teeth provided on the portion of the outer portion of the second sun double-sided gear 11 engaging with the second planet gear 13, gear teeth provided on the portion of the outer portion of the second sun double-sided gear 11 engaging with the fourth sun pinion 87, gear teeth provided on the portion of the inner portion of the first ring double-sided gear 2 engaging with the first planet gear 3, gear teeth provided on the portion 20 of the outer portion of the first ring double-sided gear 2 engaging with the ring pinion 9, gear teeth provided on the portion 19 of the inner portion of the second ring double-sided gear 12 engaging with the second planet gear 13, and gear teeth provided on the portion of the outer portion of the second ring double-sided gear 12 engaging with the ring pinion 9.

A relationship between the components, which idle, is implemented between the second sun double-sided gear 11 and the fourth sun carrier shaft 84, between the shaft of the first carrier 5 and the first sun gear shaft 34, between the shaft of the second carrier 15 and the fourth sun carrier shaft 84, and between the fourth sun carrier shaft 84 and the fourth differential side bevel gear shaft 104. A relationship between the components, which do not idle, is implemented between the first sun gear 31 and the first sun gear shaft 34 and between the fourth differential side bevel gear 89 and the fourth differential side bevel gear shaft 104.

Figure 11:
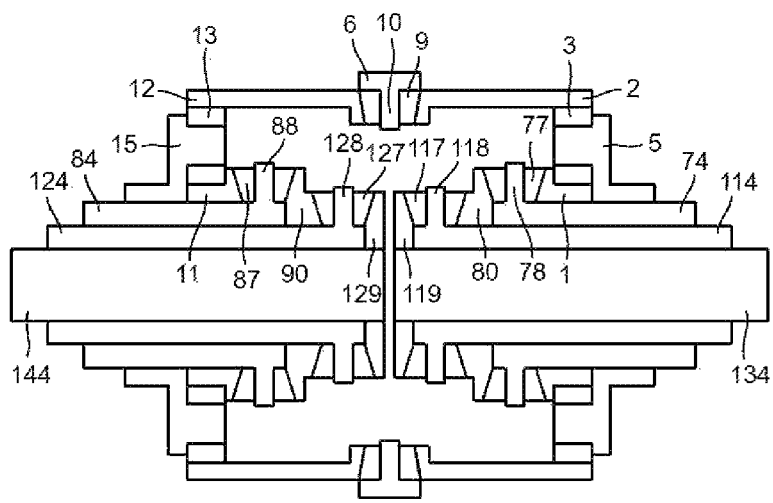
FIG. 11 illustrates a cross-section of a nine-axis planetary gear device.

FIG. 11 briefly illustrates a cross-section of a nine-axis planetary gear device configured by assembling the first sun double-sided gear 1, the first ring double-sided gear 2, the first planet gear 3, the first carrier 5, the ring 6, the ring pinion 9, the ring protrusion shaft 10, the second sun double-sided gear 11, the second ring double-sided gear 12, the second planet gear 13, the second carrier 15, the third sun carrier shaft 74, the third sun pinion 77, the third sun protrusion shaft 78, a third differential side double-sided bevel gear 80, the fourth sun carrier shaft 84, the fourth sun pinion 87, the fourth sun protrusion shaft 88, a fourth differential side double-sided bevel gear 90, a fifth sun carrier shaft 114, a fifth sun pinion 117, a fifth sun protrusion shaft 118, a fifth differential side bevel gear 119, a sixth sun carrier shaft 124, a sixth sun pinion 127, a sixth sun protrusion shaft 128, a sixth differential side bevel gear 129, a fifth differential side bevel gear shaft 134, and a sixth differential side bevel gear shaft 144.

The two carriers 5 and 15 are respectively illustrated as having hollow shafts, but the ring 6 is not illustrated as having a hollow shaft in the same way. The ring 6 has a gear formed on an outer portion thereof and implements gear connection. The ring 6 is omitted because a brake often operates together with a band, but the ring 6 is not a component that needs to be eliminated. As necessary, the ring 6 may be configured to have a hollow shaft.

Figure 12:
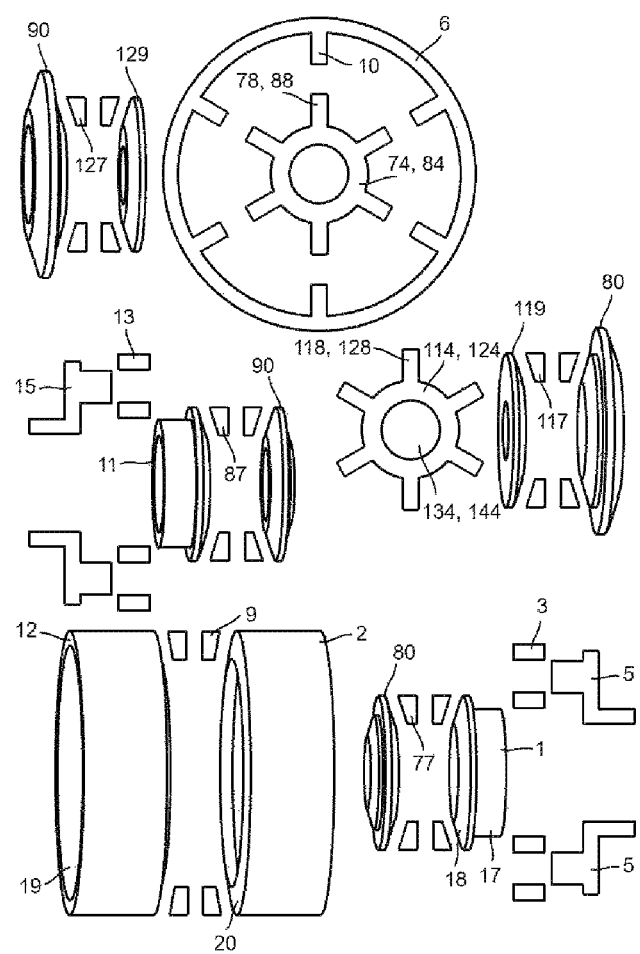
FIG. 12 illustrates a cross-sectional and perspective view of one part of the disassembled nine-axis planetary gear device.

FIG. 12 illustrates a cross-sectional view of one part of the disassembled nine-axis planetary gear device illustrated in FIG. 11 and illustrates a perspective view of another part of the disassembled nine-axis planetary gear device.

Two or more types of magnifications are used to illustrate the cross-sectional view in FIG. 12. The third differential side double-sided bevel gear 80 and the fourth differential side double-sided bevel gear 90 are illustrated twice with different magnifications to easily recognize the third differential side double-sided bevel gear 80 and the fourth differential side double-sided bevel gear 90 from surrounding objects.

Based on the fifth sun carrier shaft 114, the fifth sun pinion 117, the fifth sun protrusion shaft 118, the fifth differential side bevel gear 119, the sixth sun carrier shaft 124, the sixth sun pinion 127, the sixth sun protrusion shaft 128, the sixth differential side bevel gear 129, the fifth differential side bevel gear shaft 134, and the sixth differential side bevel gear shaft 144, the first sun double-sided gear 1, the first ring double-sided gear 2, the first planet gear 3, the first carrier 5, the ring pinion 9, the second sun double-sided gear 11, the second ring double-sided gear 12, the second planet gear 13, the second carrier 15, the third sun pinion 77, and the fourth sun pinion 87 are to correspond to the same magnification when being expanded by 25%, and the ring 6, the ring protrusion shaft 10, the third sun carrier shaft 74, the third sun protrusion shaft 78, the fourth sun carrier shaft 84, and the fourth sun protrusion shaft 88 are to correspond to the same magnification when being expanded by 13%.

The third differential side double-sided bevel gear 80 and the fourth differential side double-sided bevel gear 90, which are illustrated twice, need to be shown with different magnifications, the third differential side double-sided bevel gear 80 adjacent to the fifth sun pinion 117 is to correspond to a reference magnification, the third differential side double-sided bevel gear 80 adjacent to the third sun pinion 77 needs to be expanded by 25%, the fourth differential side double-sided bevel gear 90 adjacent to the sixth sun pinion 127 is to correspond to the reference magnification, and the fourth differential side double-sided bevel gear 90 adjacent to the fourth sun pinion 87 needs to be expanded by 25%.

The fifth sun protrusion shaft 118 is provided in the form of a protrusion at a periphery of the fifth sun carrier shaft 114, and the fifth sun pinion 117 is installed on the fifth sun protrusion shaft 118. The number of fifth sun protrusion shafts 118 and the number of fifth sun pinions 117 are not limited.

The third sun protrusion shaft 78 is provided in the form of a protrusion at a periphery of the third sun carrier shaft 74, and the third sun pinion 77 is installed on the third sun protrusion shaft 78. The number of third sun protrusion shafts 78 and the number of third sun pinions 77 are not limited.

The first sun double-sided gear 1 and the third differential side double-sided bevel gear 80 engage with two opposite sides of the third sun pinion 77. The third differential side double-sided bevel gear 80 and the fifth differential side bevel gear 119 engage with two opposite sides of the fifth sun pinion 117. The first sun double-sided gear 1 is installed on the third sun carrier shaft 74 so as to idle. The third differential side double-sided bevel gear 80 and the third sun carrier shaft 74 are installed on the fifth sun carrier shaft 114 so as to idle. The fifth sun carrier shaft 114 is installed on the fifth differential side bevel gear shaft 134 so as to idle. The fifth differential side bevel gear 119 is installed on the fifth differential side bevel gear shaft 134 so as not to idle.

The sixth sun protrusion shaft 128 is provided in the form of a protrusion at a periphery of the sixth sun carrier shaft 124, and the sixth sun pinion 127 is installed on the sixth sun protrusion shaft 128. The number of sixth sun protrusion shafts 128 and the number of sixth sun pinions 127 are not limited.

The fourth sun protrusion shaft 88 is provided in the form of a protrusion at a periphery of the fourth sun carrier shaft 84, and the fourth sun pinion 87 is installed on the fourth sun protrusion shaft 88. The number of fourth sun protrusion shafts 88 and the number of fourth sun pinions 87 are not limited.

The second sun double-sided gear 11 and the fourth differential side double-sided bevel gear 90 engage with two opposite sides of the fourth sun pinion 87. The fourth differential side double-sided bevel gear 90 and the sixth differential side bevel gear 129 engage with two opposite sides of the sixth sun pinion 127. The second sun double-sided gear 11 is installed on the fourth sun carrier shaft 84 so as to idle. The fourth differential side double-sided bevel gear 90 and the fourth sun carrier shaft 84 are installed on the sixth sun carrier shaft 124 so as to idle. The sixth sun carrier shaft 124 is installed on the sixth differential side bevel gear shaft 144 so as to idle. The sixth differential side bevel gear 129 is installed on the sixth differential side bevel gear shaft 144 so as not to idle.

The ring protrusion shaft 10 is provided in the form of a protrusion at an inner periphery of the ring 6, and the ring pinion 9 is installed on the ring protrusion shaft 10. The number of ring protrusion shafts 10 and the number of ring pinions 9 are not limited. The first ring double-sided gear 2 and the second ring double-sided gear 12 engage with two opposite sides of the ring pinion 9.

The first planet gear 3 is installed on the first carrier 5, and the second planet gear 13 is installed on the second carrier 15. The number of planet gears 3 and 13 respectively installed on the carriers 5 and 15 is not limited. One side of the first planet gear 3 engages with the first sun double-sided gear 1, and the other side of the first planet gear 3 engages with the first ring double-sided gear 2. One side of the second planet gear 13 engages with the second sun double-sided gear 11, and the other side of the second planet gear 13 engages with the second ring double-sided gear 12.

Gear teeth are omitted without being illustrated. The gear teeth, which are omitted from the drawings, are gear teeth provided on the outer portions of the first planet gear 3, the second planet gear 13, the ring pinion 9, and the sun bevel gears 77, 87, 117, and 127, and the differential side bevel gears 119 and 129, gear teeth provided on the portion of the third differential side double-sided bevel gear 80 engaging with the fifth sun pinion 117, gear teeth provided on the portion of the third differential side double-sided bevel gear 80 engaging with the third sun pinion 77, gear teeth provided on the portion of the fourth differential side double-sided bevel gear 90 engaging with the sixth sun pinion 127, gear teeth provided on the portion of the fourth differential side double-sided bevel gear 90 engaging with the fourth sun pinion 87, gear teeth provided on the portion of the fifth differential side bevel gear 119 engaging with the fifth sun pinion 117, gear teeth provided on the portion of the sixth differential side bevel gear 129 engaging with the sixth sun pinion 127, gear teeth provided on the portion 17 of the outer portion of the first sun double-sided gear 1 engaging with the first planet gear 3, gear teeth provided on the portion 18 of the outer portion of the first sun double-sided gear 1 engaging with the fifth sun pinion 117, gear teeth provided on the portion of the outer portion of the second sun double-sided gear 11 engaging with the second planet gear 13, gear teeth provided on the portion of the outer portion of the second sun double-sided gear 11 engaging with the sixth sun pinion 127, gear teeth provided on the portion of the inner portion of the first ring double-sided gear 2 engaging with the first planet gear 3, gear teeth provided on the portion 20 of the outer portion of the first ring double-sided gear 2 engaging with the ring pinion 9, gear teeth provided on the portion 19 of the inner portion of the second ring double-sided gear 12 engaging with the second planet gear 13, and gear teeth provided on the portion of the outer portion of the second ring double-sided gear 12 engaging with the ring pinion 9.

A relationship between the components, which idle, is implemented between the first sun double-sided gear 1 and the third sun carrier shaft 74, between the second sun double-sided gear 11 and the fourth sun carrier shaft 84, between the shaft of the first carrier 5 and the third sun carrier shaft 74, between the shaft of the second carrier 15 and the fourth sun carrier shaft 84, between the third differential side double-sided bevel gear 80 and the fifth sun carrier shaft 114, between the fifth sun carrier shaft 114 and the fifth differential side bevel gear shaft 134, between the fifth sun carrier shaft 114 and the third sun carrier shaft 74, between the fourth differential side double-sided bevel gear 90 and the sixth sun carrier shaft 124, between the sixth sun carrier shaft 124 and the sixth differential side bevel gear shaft 144, and between the sixth sun carrier shaft 124 and the fourth sun carrier shaft 84. A relationship between the components, which do not idle, is implemented between the fifth differential side bevel gear 119 and the fifth differential side bevel gear shaft 134 and between the sixth differential side bevel gear 129 and the sixth differential side bevel gear shaft 144.

Figure 13:
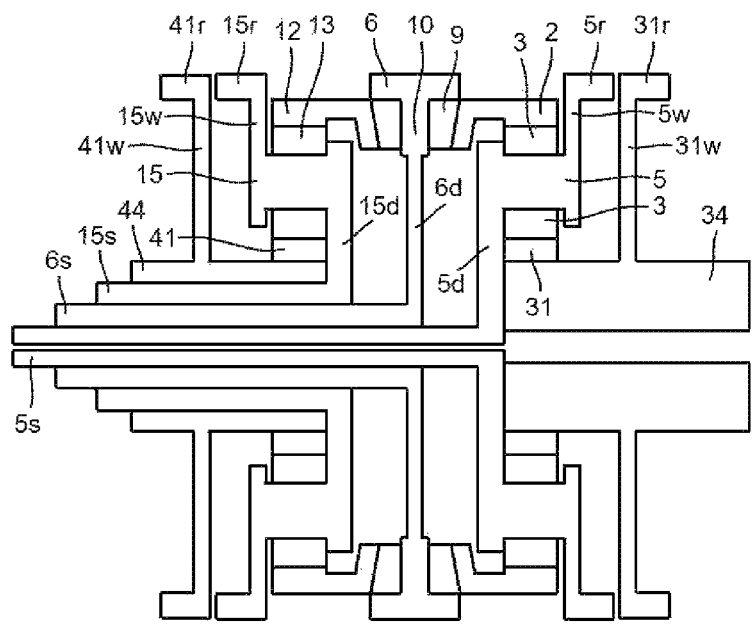
FIG. 13 illustrates a cross-section of a five-axis planetary gear device.

FIG. 13 briefly illustrates a cross-section of a five-axis planetary gear device that is a modified example of FIG. 3 and configured by assembling the first ring double-sided gear 2, the first planet gear 3, the first carrier 5, the ring 6, the ring pinion 9, the ring protrusion shaft 10, the second ring double-sided gear 12, the second planet gear 13, the second carrier 15, the first sun gear 31, the first sun gear shaft 34, the second sun gear 41, the second sun gear shaft 44, a first carrier disc 5d, a first carrier ring 5r, a first carrier shaft 5s, a first carrier wheel 5w, a ring disc 6d, a ring carrier shaft 6s, a second carrier disc 15d, a second carrier ring 15r, a second carrier shaft 15s, a second carrier wheel 15w, a first sun gear ring 31r, a first sun gear wheel 31w, a second sun gear ring 41r, and a second sun gear wheel 41w.

The first carrier shaft 5s, the ring carrier shaft 6s, the second carrier shaft 15s, the first sun gear shaft 34, and the second sun gear shaft 44 are concentric hollow shafts. However, the first carrier shaft 5s and the first sun gear shaft 34 are not limited to the hollow shaft.

The first carrier disc 5d, the ring disc 6d, and the second carrier disc 15d each have a circular plate shape and serve to transmit power between the first carrier 5, the ring 6, and the second carrier 15 and the first carrier shaft 5s, the ring carrier shaft 6s, and the second carrier shaft 15s.

The first carrier ring 5r, the second carrier ring 15r, the first sun gear ring 31r, the second sun gear ring 41r, and the ring 6 provide a space exposed to the outside and used to install the brake and are respectively connected to the first carrier 5, the second carrier 15, the first sun gear shaft 34, the second sun gear shaft 44, and the ring carrier shaft 6s through the first carrier wheel 5w, the second carrier wheel 15w, the first sun gear wheel 31w, the second sun gear wheel 41w, and the ring disc 6d.

Figure 14:
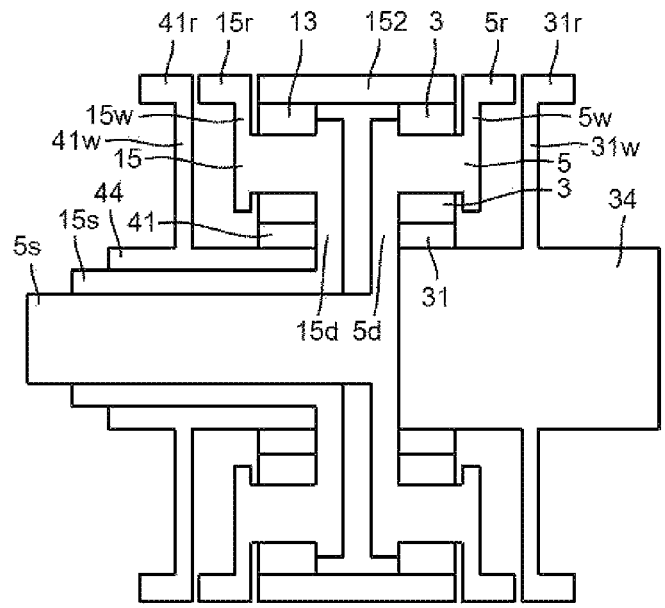
FIG. 14 illustrates a cross-section of a four-axis planetary gear device.

FIG. 14 briefly illustrates a cross-section of a four-axis planetary gear device that is a modified example of FIG. 13 and configured by assembling the first planet gear 3, the first carrier 5, the second planet gear 13, the second carrier 15, the first sun gear 31, the first sun gear shaft 34, the second sun gear 41, the second sun gear shaft 44, the first carrier disc 5d, the first carrier ring 5r, the first carrier shaft 5s, the first carrier wheel 5w, the second carrier disc 15d, the second carrier ring 15r, the second carrier shaft 15s, the second carrier wheel 15w, the first sun gear ring 31r, the first sun gear wheel 31w, the second sun gear ring 41r, the second sun gear wheel 41w, and a ring double-sided gear 152.

The ring double-sided gear 152 has a configuration identical to a configuration in which ring gears of two planetary gear devices are integrated. The ring double-sided gear 152 has gear teeth so that the planet gears 3 and 13 engage with two opposite sides of the ring double-sided gear 152. However, the gear teeth are omitted without being illustrated in the drawings.

Figure 15:
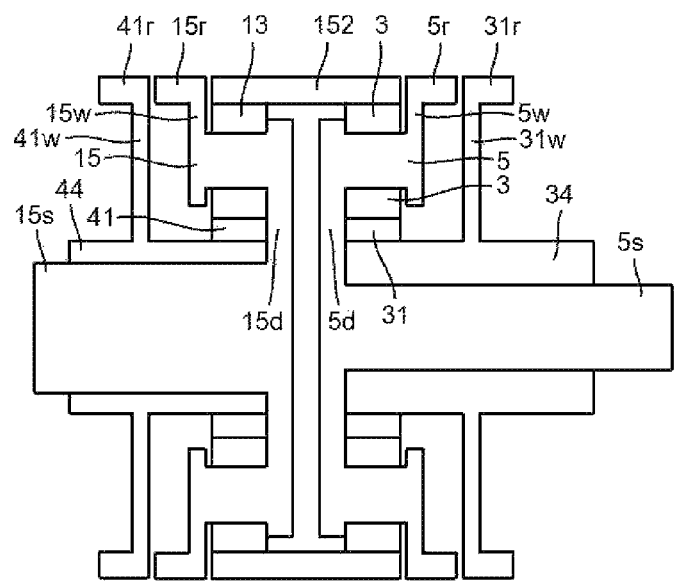
FIG. 15 illustrates two shafts which are disposed at two opposite sides.

FIG. 15 illustrates a modified example of FIG. 14 in which two shafts are disposed at two opposite sides.

Figure 16:
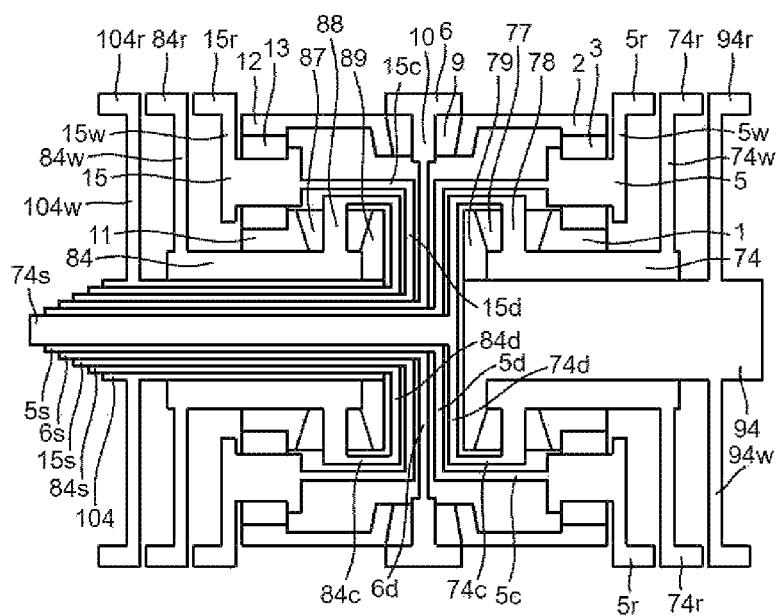
FIG. 16 illustrates a cross-section of a seven-axis planetary gear device.

FIG. 16 briefly illustrates a cross-section of a seven-axis planetary gear device that is a modified example of FIG. 7 and configured by assembling the first sun double-sided gear 1, the first ring double-sided gear 2, the first planet gear 3, the first carrier 5, the ring 6, the ring pinion 9, the ring protrusion shaft 10, the second sun double-sided gear 11, the second ring double-sided gear 12, the second planet gear 13, the second carrier 15, the third sun carrier shaft 74, the third sun pinion 77, the third sun protrusion shaft 78, the third differential side bevel gear 79, the fourth sun carrier shaft 84, the fourth sun pinion 87, the fourth sun protrusion shaft 88, the fourth differential side bevel gear 89, the third differential side bevel gear shaft 94, the fourth differential side bevel gear shaft 104, a first carrier cylinder 5c, the first carrier disc 5d, the first carrier ring 5r, the first carrier shaft 5s, the first carrier wheel 5w, a second carrier cylinder 15c, the second carrier disc 15d, the second carrier ring 15r, the second carrier shaft 15s, the second carrier wheel 15w, a third sun carrier shaft cylinder 74c, a third sun carrier shaft disc 74d, a third sun carrier shaft ring 74r, a third sun carrier shaft driving shaft 74s, a third sun carrier shaft wheel 74w, a fourth sun carrier shaft cylinder 84c, a fourth sun carrier shaft disc 84d, a fourth sun carrier shaft ring 84r, a fourth sun carrier shaft driving shaft 84s, a fourth sun carrier shaft wheel 84w, a third differential side bevel gear shaft ring 94r, a third differential side bevel gear shaft wheel 94w, a fourth differential side bevel gear shaft ring 104r, and a fourth differential side bevel gear shaft wheel 104w.

The first carrier shaft 5s, the ring carrier shaft 6s, the second carrier shaft 15s, the third sun carrier shaft 74, the fourth sun carrier shaft 84, the fourth sun carrier shaft driving shaft 84s, and the fourth differential side bevel gear shaft 104 are concentric hollow shafts.

The first carrier disc 5d, the ring disc 6d, the second carrier disc 15d, the third sun carrier shaft disc 74d, and the fourth sun carrier shaft disc 84d each have a circular plate shape, and the first carrier cylinder 5c, the second carrier cylinder 15c, the third sun carrier shaft cylinder 74c, and the fourth sun carrier shaft cylinder 84c each have a cylindrical shape. Power is transmitted to the ring 6 from the first carrier shaft 5s through the first carrier disc 5d and the first carrier cylinder 5c, from the first carrier 5 and the second carrier shaft 15s through the second carrier disc 15d and the second carrier cylinder 15c, from the second carrier 15 and the third sun carrier shaft driving shaft 74s through the third sun carrier shaft disc 74d, the third sun carrier shaft cylinder 74c, and the third sun protrusion shaft 78, from the third sun carrier shaft 74 and the fourth sun carrier shaft driving shaft 84s through the fourth sun carrier shaft disc 84d, the fourth sun carrier shaft cylinder 84c, and the fourth sun protrusion shaft 88, from the fourth sun carrier shaft 84 and the third differential side bevel gear shaft 94, from the third differential side bevel gear 79 and the fourth differential side bevel gear shaft 104, and from the fourth differential side bevel gear 89 and the ring carrier shaft 6s through the ring disc 6d and the ring protrusion shaft 10.

The first carrier wheel 5w, the second carrier wheel 15w, the third sun carrier shaft wheel 74w, the fourth sun carrier shaft wheel 84w, the third differential side bevel gear shaft wheel 94w, and the fourth differential side bevel gear shaft wheel 104w each have a circular plate shape. The first carrier ring 5r, the second carrier ring 15r, the third sun carrier shaft ring 74r, the fourth sun carrier shaft ring 84r, the third differential side bevel gear shaft ring 94r, the fourth differential side bevel gear shaft ring 104r, and the ring 6 are exposed to the outside and provide the space in which the brake may be installed. The first carrier ring 5r is connected to the ring carrier shaft 6s through the first carrier wheel 5w. The first carrier 5 and the second carrier ring 15r are connected to the ring carrier shaft 6s through the second carrier wheel 15w. The second carrier 15 and the third sun carrier shaft ring 74r are connected to the ring carrier shaft 6s through the third sun carrier shaft wheel 74w. The third sun carrier shaft 74 and the fourth sun carrier shaft ring 84r are connected to the ring carrier shaft 6s through the fourth sun carrier shaft wheel 84w. The fourth sun carrier shaft 84 and the third differential side bevel gear shaft ring 94r are connected to the ring carrier shaft 6s through the third differential side bevel gear shaft wheel 94w. The third differential side bevel gear shaft 94 and the fourth differential side bevel gear shaft ring 104r are connected to the ring carrier shaft 6s through the fourth differential side bevel gear shaft wheel 104w. The fourth differential side bevel gear shaft 104 and the ring 6 are connected to the ring carrier shaft 6s through the ring protrusion shaft 10 and the ring disc 6d.

Figure 17:
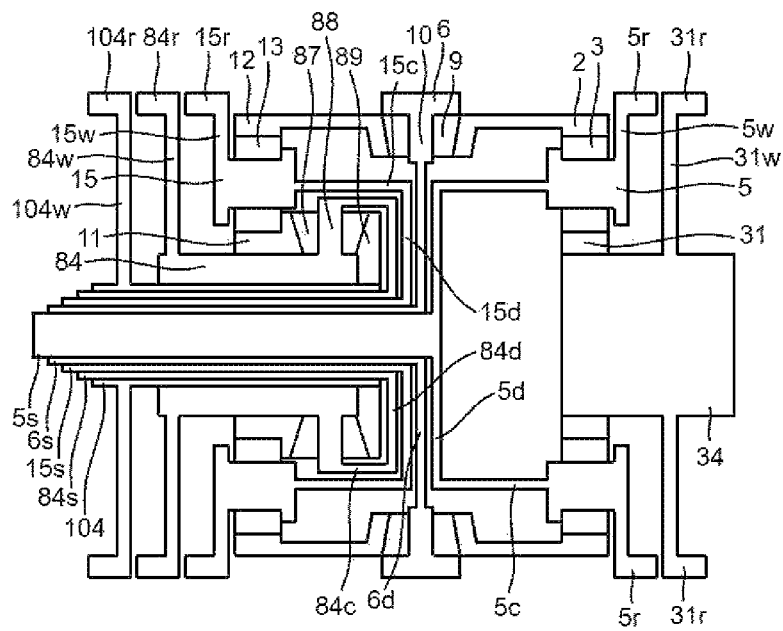
FIG. 17 illustrates a cross-section of a six-axis planetary gear device.

FIG. 17 briefly illustrates a cross-section of a six-axis planetary gear device that is a modified example of FIG. 9 and configured by assembling the first ring double-sided gear 2, the first planet gear 3, the first carrier 5, the ring 6, the ring pinion 9, the ring protrusion shaft 10, the second sun double-sided gear 11, the second ring double-sided gear 12, the second planet gear 13, the second carrier 15, the first sun gear 31, the first sun gear shaft 34, the fourth sun carrier shaft 84, the fourth sun pinion 87, the fourth sun protrusion shaft 88, the fourth differential side bevel gear 89, the fourth differential side bevel gear shaft 104, the first carrier cylinder 5c, the first carrier disc 5d, the first carrier ring 5r, the first carrier shaft 5s, the first carrier wheel 5w, the ring disc 6d, the ring carrier shaft 6s, the second carrier cylinder 15c, the second carrier disc 15d, the second carrier ring 15r, the second carrier shaft 15s, the second carrier wheel 15w, the first sun gear ring 31r, the first sun gear wheel 31w, the fourth sun carrier shaft cylinder 84c, the fourth sun carrier shaft disc 84d, the fourth sun carrier shaft ring 84r, the fourth sun carrier shaft driving shaft 84s, the fourth sun carrier shaft wheel 84w, the fourth differential side bevel gear shaft ring 104r, and the fourth differential side bevel gear shaft wheel 104w.

The ring carrier shaft 6s, the second carrier shaft 15s, the fourth sun carrier shaft driving shaft 84s, and the fourth differential side bevel gear shaft 104 are concentric hollow shafts. However, if necessary, the first carrier shaft 5s and the first sun gear shaft 34 may also be hollow shafts, or the arrangements of the shafts in a leftward/rightward direction may be changed.

The first carrier disc 5d, the ring disc 6d, the second carrier disc 15d, and the fourth sun carrier shaft disc 84d each have a circular plate shape, and the first carrier cylinder 5c, the second carrier cylinder 15c, and the fourth sun carrier shaft cylinder 84c each have a cylindrical shape. Power is transmitted to the ring 6 from the first carrier shaft 5s through the first carrier disc 5d and the first carrier cylinder 5c, from the first carrier 5 and the second carrier shaft 15s through the second carrier disc 15d and the second carrier cylinder 15c, from the second carrier 15 and the fourth sun carrier shaft driving shaft 84s through the fourth sun carrier shaft disc 84d, the fourth sun carrier shaft cylinder 84c, and the fourth sun protrusion shaft 88, from the fourth sun carrier shaft 84 and the fourth differential side bevel gear shaft 104, from the fourth differential side bevel gear 89 and the first sun gear shaft 34, and from the first sun gear 31 and the ring carrier shaft 6s through the ring disc 6d and the ring protrusion shaft 10.

The first carrier wheel 5w, the second carrier wheel 15w, the first sun gear wheel 31w, the fourth sun carrier shaft wheel 84w, and the fourth differential side bevel gear shaft wheel 104w each have a circular plate shape. The first carrier ring 5r, the second carrier ring 15r, the first sun gear ring 31r, the fourth sun carrier shaft ring 84r, the fourth differential side bevel gear shaft ring 104r, and the ring 6 are exposed to the outside and provide the space in which the brake may be installed. The first carrier ring 5r is connected to the ring carrier shaft 6s through the first carrier wheel 5w. The first carrier 5 and the second carrier ring 15r are connected to the ring carrier shaft 6s through the second carrier wheel 15w. The second carrier 15 and the fourth sun carrier shaft ring 84r are connected to the ring carrier shaft 6s through the fourth sun carrier shaft wheel 84w. The fourth sun carrier shaft 84 and the fourth differential side bevel gear shaft ring 104r are connected to the ring carrier shaft 6s through the fourth differential side bevel gear shaft wheel 104w. The fourth differential side bevel gear shaft 104 and the first sun gear ring 31r are connected to the ring carrier shaft 6s through the first sun gear wheel 31w. The first sun gear shaft 34 and the ring 6 are connected to the ring carrier shaft 6s through the ring protrusion shaft and the ring disc 6d.

Figure 18:
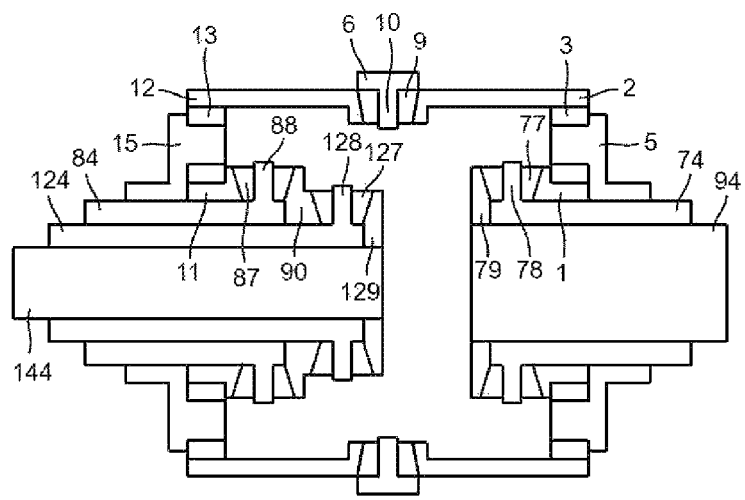
FIG. 18 illustrates a cross-section of an eight-axis planetary gear device.

FIG. 18 briefly illustrates a cross-section of an eight-axis planetary gear device configured by assembling the first sun double-sided gear 1, the first ring double-sided gear 2, the first planet gear 3, the first carrier 5, the ring 6, the ring pinion 9, the ring protrusion shaft 10, the second sun double-sided gear 11, the second ring double-sided gear 12, the second planet gear 13, the second carrier 15, the third sun carrier shaft 74, the third sun pinion 77, the third sun protrusion shaft 78, the third differential side double-sided bevel gear 79, the fourth sun carrier shaft 84, the fourth sun pinion 87, the fourth sun protrusion shaft 88, the fourth differential side double-sided bevel gear 90, the sixth sun carrier shaft 124, the sixth sun pinion 127, the sixth sun protrusion shaft 128, the sixth differential side bevel gear 129, the third differential side bevel gear shaft 94, and the sixth differential side bevel gear shaft 144.

As necessary, the ring 6 may be configured to have a hollow shaft.

The structure in FIG. 18 may be recognized with reference to the descriptions in FIGS. 11, 12, and 7. Therefore, the repeated detailed description will be omitted.

Figure 19:
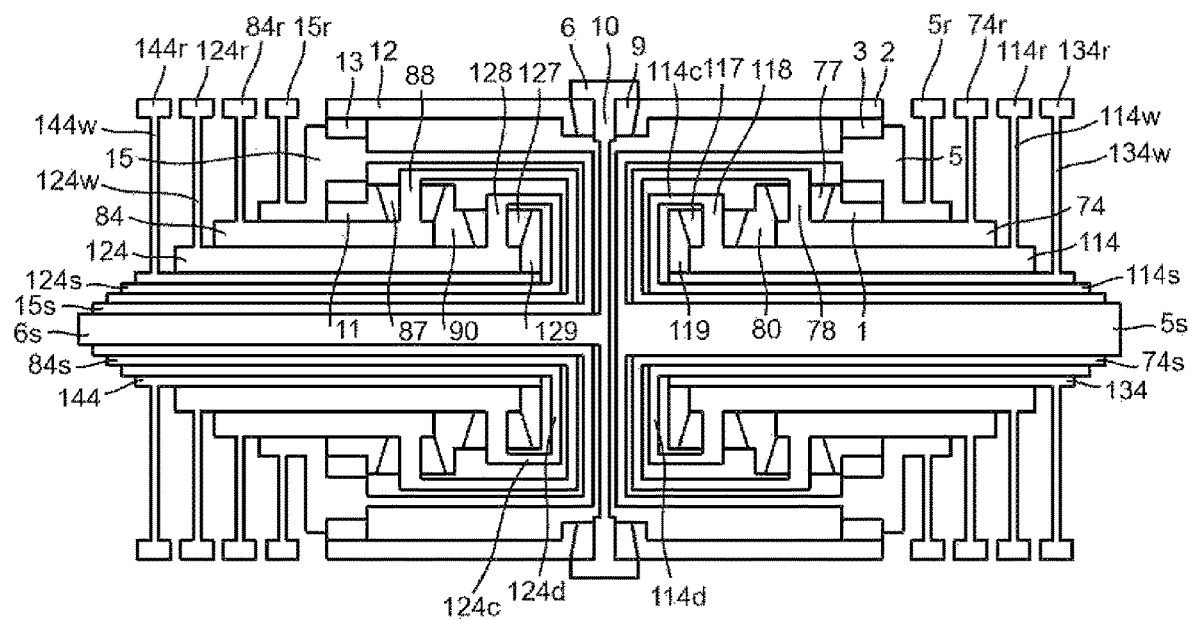
FIG. 19 illustrates a cross-section of a nine-axis planetary gear device.

FIG. 19 briefly illustrates a cross-section of a nine-axis planetary gear device that is a modified example of FIG. 11 and configured by assembling the first sun double-sided gear 1, the first ring double-sided gear 2, the first planet gear 3, the first carrier 5, the ring 6, the ring pinion 9, the ring protrusion shaft 10, the second sun double-sided gear 11, the second ring double-sided gear 12, the second planet gear 13, the second carrier 15, the third sun carrier shaft 74, the third sun pinion 77, the third sun protrusion shaft 78, the third differential side double-sided bevel gear 80, the fourth sun carrier shaft 84, the fourth sun pinion 87, the fourth sun protrusion shaft 88, the fourth differential side double-sided bevel gear 90, the fifth sun carrier shaft 114, the fifth sun pinion 117, the fifth sun protrusion shaft 118, the fifth differential side bevel gear 119, the sixth sun carrier shaft 124, the sixth sun pinion 127, the sixth sun protrusion shaft 128, the sixth differential side bevel gear 129, the fifth differential side bevel gear shaft 134, the sixth differential side bevel gear shaft 144, the first carrier cylinder 5c, the first carrier disc 5d, the first carrier ring 5r, the first carrier shaft 5s, the first carrier wheel 5w, the second carrier cylinder 15c, the second carrier disc 15d, the second carrier ring 15r, the second carrier shaft 15s, the second carrier wheel 15w, the ring disc 6d, the ring carrier shaft 6s, the third sun carrier shaft cylinder 74c, the third sun carrier shaft disc 74d, the third sun carrier shaft ring 74r, the third sun carrier shaft driving shaft 74s, the third sun carrier shaft wheel 74w, the fourth sun carrier shaft cylinder 84c, the fourth sun carrier shaft disc 84d, the fourth sun carrier shaft ring 84r, the fourth sun carrier shaft driving shaft 84s, the fourth sun carrier shaft wheel 84w, a fifth sun carrier shaft cylinder 114c, a fifth sun carrier shaft disc 114d, a fifth sun carrier shaft ring 114r, a fifth sun carrier shaft driving shaft 114s, a fifth sun carrier shaft wheel 114w, a sixth sun carrier shaft cylinder 124c, a sixth sun carrier shaft disc 124d, a sixth sun carrier shaft ring 124r, a sixth sun carrier shaft driving shaft 124s, a sixth sun carrier shaft wheel 124w, a fifth differential side bevel gear shaft ring 134r, a fifth differential side bevel gear shaft wheel 134w, a sixth differential side bevel gear shaft ring 144r, and a sixth differential side bevel gear shaft wheel 144w.

The second carrier shaft 15s, the third sun carrier shaft 74, the third sun carrier shaft driving shaft 74s, the fifth sun carrier shaft 114, the fifth sun carrier shaft driving shaft 114s, the fifth differential side bevel gear shaft 134, the fourth sun carrier shaft 84, the fourth sun carrier shaft driving shaft 84s, the sixth sun carrier shaft 124, the sixth sun carrier shaft driving shaft 124s, and the sixth differential side bevel gear shaft 144 are concentric hollow shafts.

The first carrier disc 5d, the ring disc 6d, the second carrier disc 15d, the third sun carrier shaft disc 74d, the fourth sun carrier shaft disc 84d, the fifth sun carrier shaft disc 114d, and the sixth sun carrier shaft disc 124d each have a circular plate shape, and the first carrier cylinder 5c, the second carrier cylinder 15c, the third sun carrier shaft cylinder 74c, the fourth sun carrier shaft cylinder 84c, the fifth sun carrier shaft cylinder 114c, and the sixth sun carrier shaft cylinder 124c each have a cylindrical shape.

Power is transmitted to the ring 6 from the first carrier shaft 5s through the first carrier disc 5d and the first carrier cylinder 5c, from the first carrier 5 and the second carrier shaft 15s through the second carrier disc 15d and the second carrier cylinder 15c, from the second carrier 15 and the third sun carrier shaft driving shaft 74s through the third sun carrier shaft disc 74d, the third sun carrier shaft cylinder 74c, and the third sun protrusion shaft 78, from the third sun carrier shaft 74 and the fourth sun carrier shaft driving shaft 84s through the fourth sun carrier shaft disc 84d, the fourth sun carrier shaft cylinder 84c, and the fourth sun protrusion shaft 88, from the fourth sun carrier shaft 84 and the fifth sun carrier shaft driving shaft 114s through the fifth sun carrier shaft disc 114d, the fifth sun carrier shaft cylinder 114c, and the fifth sun protrusion shaft 118, from the fifth sun carrier shaft 114 and the sixth sun carrier shaft driving shaft 124s through the sixth sun carrier shaft disc 124d, the sixth sun carrier shaft cylinder 124c, and the sixth sun protrusion shaft 128, from the sixth sun carrier shaft 124 and the fifth differential side bevel gear shaft 134, from the fifth differential side bevel gear 119 and the sixth differential side bevel gear shaft 144, and from the sixth differential side bevel gear 129 and the ring carrier shaft 6s through the ring disc 6d and the ring protrusion shaft 10.

The first carrier wheel 5w, the second carrier wheel 15w, the third sun carrier shaft wheel 74w, the fourth sun carrier shaft wheel 84w, the fifth sun carrier shaft wheel 114w, the sixth sun carrier shaft wheel 124w, the fifth differential side bevel gear shaft wheel 134w, and the sixth differential side bevel gear shaft wheel 144w each have a circular plate shape. The first carrier ring 5r, the second carrier ring 15r, the third sun carrier shaft ring 74r, the fourth sun carrier shaft ring 84r, the fifth sun carrier shaft ring 114r, the sixth sun carrier shaft ring 124r, the fifth differential side bevel gear shaft ring 134r, the sixth differential side bevel gear shaft ring 144r, and the ring 6 are exposed to the outside and provide the space in which the brake may be installed. The first carrier ring 5*r* is connected to the ring carrier shaft 6*s* through the first carrier wheel 5*w*. The first carrier 5 and the second carrier ring 15*r* are connected to the ring carrier shaft 6*s* through the second carrier wheel 15*w*. The second carrier 15 and the third sun carrier shaft ring 74*r* are connected to the ring carrier shaft 6*s* through the third sun carrier shaft wheel 74*w*. The third sun carrier shaft 74 and the fourth sun carrier shaft ring 84*r* are connected to the ring carrier shaft 6*s* through the fourth sun carrier shaft wheel 84*w*. The fourth sun carrier shaft 84 and the fifth sun carrier shaft ring 114*r* are connected to the ring carrier shaft 6*s* through the fifth sun carrier shaft wheel 114*w*. The fifth sun carrier shaft 114 and the sixth sun carrier shaft ring 124*r* are connected to the ring carrier shaft 6*s* through the sixth sun carrier shaft wheel 124*w*. The sixth sun carrier shaft 124 and the fifth differential side bevel gear shaft ring 134*r* are connected to the ring carrier shaft 6*s* through the fifth differential side bevel gear shaft wheel 134*w*. The fifth differential side bevel gear shaft 134 and the sixth differential side bevel gear shaft ring 144*r* are connected to the ring carrier shaft 6*s* through the sixth differential side bevel gear shaft wheel 144*w*. The sixth differential side bevel gear shaft 144 and the ring 6 are connected to the ring carrier shaft 6*s* through the ring protrusion shaft 10 and the ring disc 6*d*.

Figure 20:
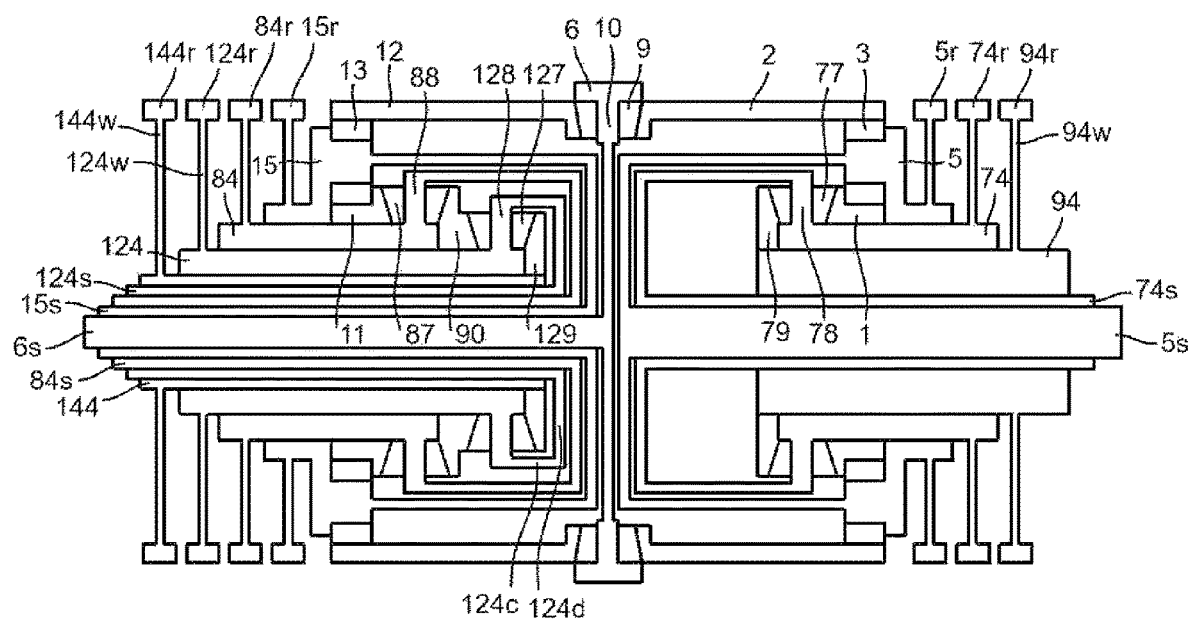
FIG. 20 illustrates a cross-section of an eight-axis planetary gear device.

FIG. 20 briefly illustrates a cross-section of an eight-axis planetary gear device that is a modified example of FIG. 18 and configured by assembling the first sun double-sided gear 1, the first ring double-sided gear 2, the first planet gear 3, the first carrier 5, the ring 6, the ring pinion 9, the ring protrusion shaft 10, the second sun double-sided gear 11, the second ring double-sided gear 12, the second planet gear 13, the second carrier 15, the third sun carrier shaft 74, the third sun pinion 77, the third sun protrusion shaft 78, the third differential side bevel gear 79, the fourth sun carrier shaft 84, the fourth sun pinion 87, the fourth sun protrusion shaft 88, the fourth differential side double-sided bevel gear 90, the third differential side bevel gear shaft 94, the sixth sun carrier shaft 124, the sixth sun pinion 127, the sixth sun protrusion shaft 128, the sixth differential side bevel gear 129, the sixth differential side bevel gear shaft 144, the first carrier cylinder 5*c*, the first carrier disc 5*d*, the first carrier ring 5*r*, the first carrier shaft 5*s*, the first carrier wheel 5*w*, the second carrier cylinder 15*c*, the second carrier disc 15*d*, the second carrier ring 15*r*, the second carrier shaft 15*s*, the second carrier wheel 15*w*, the ring disc 6*d*, the ring carrier shaft 6*s*, the third sun carrier shaft cylinder 74*c*, the third sun carrier shaft disc 74*d*, the third sun carrier shaft ring 74*r*, the third sun carrier shaft driving shaft 74*s*, the third sun carrier shaft wheel 74*w*, the fourth sun carrier shaft cylinder 84*c*, the fourth sun carrier shaft disc 84*d*, the fourth sun carrier shaft ring 84*r*, the fourth sun carrier shaft driving shaft 84*s*, the fourth sun carrier shaft wheel 84*w*, the third differential side bevel gear shaft ring 94*r*, the third differential side bevel gear shaft wheel 94*w*, the sixth sun carrier shaft cylinder 124*c*, the sixth sun carrier shaft disc 124*d*, the sixth sun carrier shaft ring 124*r*, the sixth sun carrier shaft driving shaft 124*s*, the sixth sun carrier shaft wheel 124*w*, the sixth differential side bevel gear shaft ring 144*r*, and the sixth differential side bevel gear shaft wheel 144*w*.

The second carrier shaft 15*s*, the third sun carrier shaft 74, the third sun carrier shaft driving shaft 74*s*, the fourth sun carrier shaft 84, the fourth sun carrier shaft driving shaft 84*s*, the third differential side bevel gear shaft 94, the sixth sun carrier shaft 124, the sixth sun carrier shaft driving shaft 124*s*, and the sixth differential side bevel gear shaft 144 are concentric hollow shaft.

The first carrier disc 5*d*, the ring disc 6*d*, the second carrier disc 15*d*, the third sun carrier shaft disc 74*d*, the fourth sun carrier shaft disc 84*d*, and the sixth sun carrier shaft disc 124*d* each have a circular plate shape, and the first carrier cylinder 5*c*, the second carrier cylinder 15*c*, the third sun carrier shaft cylinder 74*c*, the fourth sun carrier shaft cylinder 84*c*, and the sixth sun carrier shaft cylinder 124*c* each have a cylindrical shape.

Power is transmitted to the ring 6 from the first carrier shaft 5*s* through the first carrier disc 5*d* and the first carrier cylinder 5*c*, from the first carrier 5 and the second carrier shaft 15*s* through the second carrier disc 15*d* and the second carrier cylinder 15*c*, from the second carrier 15 and the third sun carrier shaft driving shaft 74*s* through the third sun carrier shaft disc 74*d*, the third sun carrier shaft cylinder 74*c*, and the third sun protrusion shaft 78, from the third sun carrier shaft 74 and the fourth sun carrier shaft driving shaft 84*s* through the fourth sun carrier shaft disc 84*d*, the fourth sun carrier shaft cylinder 84*c*, and the fourth sun protrusion shaft 88, from the fourth sun carrier shaft 84 and the third differential side bevel gear shaft 94, from the third differential side bevel gear 79 and the sixth sun carrier shaft driving shaft 124*s* through the sixth sun carrier shaft disc 124*d*, the sixth sun carrier shaft cylinder 124*c*, and the sixth sun protrusion shaft 128, from the sixth sun carrier shaft 124 and the sixth differential side bevel gear shaft 144, and from the sixth differential side bevel gear 129 and the ring carrier shaft 6*s* through the ring disc 6*d* and the ring protrusion shaft 10.

The first carrier wheel 5*w*, the second carrier wheel 15*w*, the third sun carrier shaft wheel 74*w*, the fourth sun carrier shaft wheel 84*w*, the third differential side bevel gear shaft wheel 94*w*, the sixth sun carrier shaft wheel 124*w*, and the sixth differential side bevel gear shaft wheel 144*w* each have a circular plate shape. The first carrier ring 5*r*, the second carrier ring 15*r*, the third sun carrier shaft ring 74*r*, the fourth sun carrier shaft ring 84*r*, the third differential side bevel gear shaft ring 94*r*, the sixth sun carrier shaft ring 124*r*, the sixth differential side bevel gear shaft ring 144*r*, and the ring 6 are exposed to the outside and provide the space in which the brake may be installed. The first carrier ring 5*r* is connected to the ring carrier shaft 6*s* through the first carrier wheel 5*w*. The first carrier 5 and the second carrier ring 15*r* are connected to the ring carrier shaft 6*s* through the second carrier wheel 15*w*. The second carrier 15 and the third sun carrier shaft ring 74*r* are connected to the ring carrier shaft 6*s* through the third sun carrier shaft wheel 74*w*. The third sun carrier shaft 74 and the fourth sun carrier shaft ring 84*r* are connected to the ring carrier shaft 6*s* through the fourth sun carrier shaft wheel 84*w*. The fourth sun carrier shaft 84 and the third differential side bevel gear shaft ring 94*r* are connected to the ring carrier shaft 6*s* through the third differential side bevel gear shaft wheel 94*w*. The third differential side bevel gear shaft 94 and the sixth sun carrier shaft ring 124*r* are connected to the ring carrier shaft 6*s* through the sixth sun carrier shaft wheel 124*w*. The sixth sun carrier shaft 124 and the sixth differential side bevel gear shaft ring 144*r* are connected to the ring carrier shaft 6*s* through the sixth differential side bevel gear shaft wheel 144*w*. The sixth differential side bevel gear shaft 144 and the ring 6 are connected to the ring carrier shaft 6*s* through the ring protrusion shaft 10 and the ring disc 6*d*.

The specific contents of the present invention will be described in detail with reference to the embodiment of the present invention illustrated in the accompanying drawings. However, the present invention is not limited to the contents illustrated in the drawings.

FIGS. 1 and 2 are views illustrating a four-axis planetary gear device according to the present invention. The first planet gear 3 and the second planet gear 13 respectively rotate about the first carrier 5 and the second carrier 15 and revolve around the sun carrier shaft 4. The sun pinion 7 and the ring pinion 9 respectively rotate about the sun protrusion shaft 8 and the ring protrusion shaft 10 and revolve around the sun carrier shaft 4.

Four shafts, which are connected to one another and operated in an apparatus, are provided as the shaft of the first carrier 5, the shaft of the second carrier 15, the sun carrier shaft 4, and the shaft of the ring 6. A hollow shaft may be made and used for the ring 6, or the ring 6 may be used through external direct contact without a hollow shaft. Therefore, the shaft is not illustrated.

It can be seen that the apparatus in FIGS. 1 and 2 includes four planetary gear devices.

Two planetary gear devices are provided which include a planetary gear device in which the first sun double-sided gear 1, the first planet gear 3, and the first ring double-sided gear 2 are respectively used as a sun gear, a planet gear, and a ring gear, and a planetary gear device in which the second sun double-sided gear 11, the second planet gear 13, and the second ring double-sided gear 12 are respectively used as a sun gear, a planet gear, and a ring gear. Further, two differential gear devices are provided which include a differential gear device in which the first sun double-sided gear 1 and the second sun double-sided gear 11 are used as differential side gears, the sun pinion 7 is used as a differential pinion, and the sun carrier shaft 4 is used as a differential carrier, and a differential gear device in which the first ring double-sided gear 2 and the second ring double-sided gear 12 are used as differential side gears, the ring pinion 9 is used as a differential pinion, and the ring 6 is used as a differential carrier. In this case, the former differential gear device having the differential carrier provided at the rotation center will be referred to as a 'sun differential gear device', and the later differential gear device having the differential carrier provided at the rotation circumference will be referred to as a 'ring differential gear device'.

The first sun double-sided gear 1, the second sun double-sided gear 11, the first ring double-sided gear 2, and the second ring double-sided gear 12 respectively have the gears used for the two planetary gear devices and the gears used for the two differential gear devices and are integrated into a single configuration to implement connection between the two planetary gear devices and the two differential gear devices. In other words, the two sun gears of the two planetary gear devices and the two differential side gears of the sun differential gear device are integrated into a single configuration, and the two ring gears of the two planetary gear devices and the two differential side gears of the ring differential gear device are integrated into a single configuration.

It can be seen that in case that any one of the four shafts is configured as an output shaft, and the remaining shafts are configured as input shafts, very various gear shift ratios may be obtained from the four-axis planetary gear device by selecting an operation of transmitting a rotational force to the input shafts or braking the input shafts. However, the number of output shafts is not limited to one. Further, one shaft may be configured as an output shaft or an input shaft. The rotational forces may be merged or distributed between the plurality of shafts.

FIGS. 3 and 4 are views illustrating a five-axis planetary gear device according to the present invention. In comparison with the apparatus illustrated in FIGS. 1 and 2, the sun pinion 7 and the sun protrusion shaft 8 are excluded, and the sun carrier shaft 4 is divided into two shafts, i.e., the first sun gear shaft 34 and the second sun gear shaft 44. The shapes of the first sun double-sided gear 1 and the second sun double-sided gear 11 illustrated in FIGS. 1 and 2 are simplified, like the shapes of the first sun gear 31 and the second sun gear 41. As a result, the first sun gear shaft 34 and the second sun gear shaft 44 may rotate independently of each other.

Five shafts, which are connected to one another and operated in the apparatus, are provided as the shaft of the first carrier 5, the shaft of the second carrier 15, the shaft of the ring 6, the first sun gear shaft 34, and the second sun gear shaft 44. A hollow shaft may be made and used for the ring 6, or the ring 6 may be used through external direct contact without a hollow shaft. Therefore, the shaft is not illustrated.

It can be seen that the apparatus in FIGS. 3 and 4 includes three planetary gear devices.

Two planetary gear devices are provided which include a planetary gear device in which the first sun gear 31, the first planet gear 3, and the first ring double-sided gear 2 are respectively used as a sun gear, a planet gear, and a ring gear, and a planetary gear device in which the second sun gear 41, the second planet gear 13, and the second ring double-sided gear 12 are respectively used as a sun gear, a planet gear, and a ring gear. Further, there is a ring differential gear device in which the first ring double-sided gear 2 and the second ring double-sided gear 12 are used as differential side gears, the ring pinion 9 is used as a differential pinion, and the ring 6 is used as a differential carrier.

The first ring double-sided gear 2 and the second ring double-sided gear 12 respectively have the gears used for the two planetary gear devices and the gears used for the ring differential gear device and are integrated into a single configuration to implement connection between the two planetary gear devices and the ring differential gear device. In other words, the two ring gears of the two planetary gear devices and the two differential side gears of the ring differential gear device are integrated into a single configuration.

It can be seen that in case that any one of the five shafts is configured as an output shaft, and the remaining shafts are configured as input shafts, very various gear shift ratios may be obtained from the five-axis planetary gear device by selecting an operation of transmitting a rotational force to the input shafts or braking the input shafts. However, the number of output shafts is not limited to one. Further, one shaft may be configured as an output shaft or an input shaft. The rotational forces may be merged or distributed between the plurality of shafts. In addition, any one of or both the first ring double-sided gear 2 and the second ring double-sided gear 12 are braked, the planetary gear device including the first sun gear shaft 34 and the planetary gear device including the second sun gear shaft 44 are separated from each other and operated independently. For example, when the first ring double-sided gear 2 is braked, the shaft of the first carrier 5 and the first sun gear shaft 34 may each be a kind of reduction gear, and the second sun gear shaft 44, the shaft of the second carrier 15, and the shaft of the ring 6 constitute the single three-axis planetary gear device. When both the first ring double-sided gear 2 and the second ring double-sided gear 12 are braked, the two reduction gears may be implemented.

A modified example of FIGS. 3 and 4 is illustrated in FIGS. 13 to 15. The modification ensures the space in which the brake may be installed.

FIGS. 5 and 6 are views illustrating another five-axis planetary gear device according to the present invention. The ring pinion 9, the ring protrusion shaft 10, and the ring 6 illustrated in FIGS. 1 and 2 are excluded. The shapes of the first ring double-sided gear 2 and the second ring double-sided gear 12 are simplified, like the first ring gear 52 and the second ring gear 62 illustrated in FIGS. 5 and 6. As a result, the first ring gear 52 and the second ring gear 62 may rotate independently of each other.

Five shafts, which are connected to one another and operated in the apparatus, are provided as the shaft of the first carrier 5, the shaft of the second carrier 15, the sun carrier shaft 4, the shaft of the first ring gear 52, and the shaft of the second ring gear 62. Hollow shafts may be made and used for the first ring gear 52 and the second ring gear 62, or the ring gears 52 and 62 may be used through external direct contact without a hollow shaft. Therefore, the shaft is not illustrated.

It can be seen that the apparatus in FIGS. 5 and 6 includes three planetary gear devices.

Two planetary gear devices are provided which include a planetary gear device in which the first sun double-sided gear 1, the first planet gear 3, and the first ring gear 52 are respectively used as a sun gear, a planet gear, and a ring gear, and a planetary gear device in which the second sun double-sided gear 11, the second planet gear 13, and the second ring gear 62 are respectively used as a sun gear, a planet gear, and a ring gear. Further, there is a sun differential gear device in which the first sun double-sided gear 1 and the second sun double-sided gear 11 are used as differential side gears, the sun pinion 7 is used as a differential pinion, and the sun carrier shaft 4 is used as a differential carrier.

The first sun double-sided gear 1 and the second sun double-sided gear 11 respectively have the gears used for the two planetary gear devices and the gears used for the sun differential gear device and are integrated into a single configuration to implement connection the two planetary gear devices and the sun differential gear device. In other words, the two sun gears of the two planetary gear devices and the two differential side gears of the sun differential gear device are integrated into a single configuration.

It can be seen that in case that any one of the five shafts is configured as an output shaft, and the remaining shafts are configured as input shafts, very various gear shift ratios may be obtained from the five-axis planetary gear device by selecting an operation of transmitting a rotational force to the input shafts or braking the input shafts. However, the number of output shafts is not limited to one. Further, one shaft may be configured as an output shaft or an input shaft. The rotational forces may be merged or distributed between the plurality of shafts.

FIGS. 7 and 8 are views illustrating a seven-axis planetary gear device according to the present invention. The third sun carrier shaft 74, the third sun protrusion shaft 78, the third sun pinion 77, the third differential side bevel gear 79, the third differential side bevel gear shaft 94, the fourth sun carrier shaft 84, the fourth sun protrusion shaft 88, the fourth sun pinion 87, the fourth differential side bevel gear 89, and the fourth differential side bevel gear shaft 104 are used in a state in which the sun carrier shaft 4, the sun protrusion shaft 8, and the sun pinion 7, which are provided in the apparatus illustrated in FIGS. 1 and 2, are respectively disposed at left and right sides.

Seven shafts, which are connected to one another and operated in the apparatus, are provided as the shaft of the first carrier 5, the shaft of the second carrier 15, the shaft of the ring 6, the third sun carrier shaft 74, the fourth sun carrier shaft 84, the third differential side bevel gear shaft 94, and the fourth differential side bevel gear shaft 104. A hollow shaft may be made and used for the ring 6, or the ring 6 may be used through external direct contact without a hollow shaft. Therefore, the shaft is not illustrated.

It can be seen that the apparatus in FIGS. 7 and 8 includes five planetary gear devices.

Two planetary gear devices are provided which include a planetary gear device in which the first sun double-sided gear 1, the first planet gear 3, and the first ring double-sided gear 2 are respectively used as a sun gear, a planet gear, and a ring gear, and a planetary gear device in which the second sun double-sided gear 11, the second planet gear 13, and the second ring double-sided gear 12 are respectively used as a sun gear, a planet gear, and a ring gear. Further, three differential gear devices are provided which include a sun differential gear device in which the first sun double-sided gear 1 and the third differential side bevel gear 79 are used as differential side gears, the third sun pinion 77 is used as a differential pinion, and the third sun carrier shaft 74 is used as a differential carrier, a sun differential gear device in which the second sun double-sided gear 11 and the fourth differential side bevel gear 89 are used as differential side gears, the fourth sun pinion 87 is used as a differential pinion, and the fourth sun carrier shaft 84 is used as a differential carrier, and a ring differential gear device in which the first ring double-sided gear 2 and the second ring double-sided gear 12 are used as differential side gears, the ring pinion 9 is used as a differential pinion, and the ring 6 is used as a differential carrier.

The first sun double-sided gear 1, the second sun double-sided gear 11, the first ring double-sided gear 2, and the second ring double-sided gear 12 respectively have the gears used for the two planetary gear devices and the gears used for the three differential gear devices and are integrated with a single configuration to implement connection between the two planetary gear devices and the three differential gear devices. In other words, the two ring gears of the two planetary gear devices and the two differential side gears of the ring differential gear device are integrated into a single configuration, and the two sun gears of the two planetary gear devices and any one of the two differential side gears of each of the two sun differential gear devices are integrated into a single configuration.

In other words, it can be seen that the apparatus illustrated in FIGS. 3 and 4 further includes the two sun differential gear devices, such that the two sun gears of the two planetary gear devices and any one of the two differential side gears of each of the further included two sun differential gear devices are integrated into a single configuration.

It can be seen that in case that any one of the seven shafts is configured as an output shaft, and the remaining shafts are configured as input shafts, very various gear shift ratios may be obtained from the seven-axis planetary gear device by selecting an operation of transmitting a rotational force to the input shafts or braking the input shafts. However, the number of output shafts is not limited to one. Further, one shaft may be configured as an output shaft or an input shaft. The rotational forces may be merged or distributed between the plurality of shafts. In addition, when any one of or both the first ring double-sided gear 2 and the second ring double-sided gear 12 are braked, the planetary gear device including the third differential side bevel gear shaft 94 and the planetary gear device including the fourth differential side bevel gear shaft 104 are separated from each other and operated independently. For example, when the first ring double-sided gear 2 is braked, the third differential side bevel gear shaft 94, the third sun carrier shaft 74, and the shaft of the first carrier 5 constitute the single three-axis planetary gear device, and the fourth differential side bevel gear shaft 104, the fourth sun carrier shaft 84, the shaft of the second carrier 15, and the shaft of the ring 6 constitute the single four-axis planetary gear device. When the first ring double-sided gear 2 and the second ring double-sided gear 12 are simultaneously braked, the two three-axis planetary gear devices are implemented.

A modified example of FIGS. 7 and 8 is illustrated in FIGS. 13 to 16. The modification ensures the space in which the brake may be installed.

FIGS. 9 and 10 are views illustrating a six-axis planetary gear device according to the present invention that is a modification made by applying half of eccentric configurations in FIGS. 3 and 7. The common components in FIGS. 3 and 7, i.e., the first ring double-sided gear 2, the first planet gear 3, the first carrier 5, the ring 6, the ring pinion 9, the ring protrusion shaft 10, the second ring double-sided gear 12, the second planet gear 13, and the second carrier 15 are adopted and used. The first sun gear 31 and the first sun gear shaft 34 in FIG. 3 are adopted and used. The second sun double-sided gear 11, the fourth sun carrier shaft 84, the fourth sun protrusion shaft 88, the fourth sun pinion 87, the fourth differential side bevel gear 89, and the fourth differential side bevel gear shaft 104 in FIG. 7 are adopted and used.

Six shafts, which are connected to one another and operated in the apparatus, are provided as the shaft of the first carrier 5, the shaft of the second carrier 15, the shaft of the ring 6, the first sun gear shaft 34, the fourth sun carrier shaft 84, and the fourth differential side bevel gear shaft 104. A hollow shaft may be made and used for the ring 6, or the ring 6 may be used through external direct contact without a hollow shaft. Therefore, the shaft is not illustrated.

It can be seen that the apparatus in FIGS. 9 and 10 includes four planetary gear devices.

Two planetary gear devices are provided which include a planetary gear device in which the first sun gear 31, the first planet gear 3, and the first ring double-sided gear 2 are respectively used as a sun gear, a planet gear, and a ring gear, and a planetary gear device in which the second sun double-sided gear 11, the second planet gear 13, and the second ring double-sided gear 12 are respectively used as a sun gear, a planet gear, and a ring gear. Two differential gear devices are provided which include a sun differential gear device in which the second sun double-sided gear 11 and the fourth differential side bevel gear 89 are used as differential side gears, the fourth sun pinion 87 is used as a differential pinion, and the fourth sun carrier shaft 84 is used as a differential carrier, and a ring differential gear device in which the first ring double-sided gear 2 and the second ring double-sided gear 12 are used as differential side gears, the ring pinion 9 is used as a differential pinion, and the ring 6 is used as a differential carrier.

The second sun double-sided gear 11, the first ring double-sided gear 2, and the second ring double-sided gear 12 respectively have the gears used for the two planetary gear devices and the gears used for the two differential gear devices and are integrated into a single configuration to implement connection between the two planetary gear devices and the two differential gear devices. In other words, the two ring gears of the two planetary gear devices and the two differential side gears of the ring differential gear device are integrated into a single configuration, and any one of the two sun gears of the two planetary gear devices and any one of the two differential side gears of the sun differential gear device are integrated into a single configuration. In other words, it can be seen that the apparatus illustrated in FIGS. 3 and 4 further includes the sun differential gear device, such that any one of the two sun gears of the two planetary gear devices and any one of the two differential side gears of the further included sun differential gear device are integrated into a single configuration.

It can be seen that in case that any one of the six shafts is configured as an output shaft, and the remaining shafts are configured as input shafts, very various gear shift ratios may be obtained from the six-axis planetary gear device by selecting an operation of transmitting a rotational force to the input shafts or braking the input shafts. However, the number of output shafts is not limited to one. Further, one shaft may be configured as an output shaft or an input shaft. The rotational forces may be merged or distributed between the plurality of shafts. In addition, any one of or both the first ring double-sided gear 2 and the second ring double-sided gear 12 are braked, the planetary gear device including the first sun gear shaft 34 and the planetary gear device including the fourth differential side bevel gear shaft 104 are separated from each other and operated independently. For example, when the first ring double-sided gear 2 is braked, the first sun gear shaft 34 and the shaft of the first carrier 5 are each a kind of reduction gear, and the fourth differential side bevel gear shaft 104, the fourth sun carrier shaft 84, the shaft of the second carrier 15, and the shaft of the ring 6 constitute the single four-axis planetary gear device.

When the second ring double-sided gear 12 is braked, the first sun gear shaft 34, the shaft of the first carrier 5, and the shaft of the ring 6 constitute the single three-axis planetary gear device, and the fourth differential side bevel gear shaft 104, the fourth sun carrier shaft 84, and the shaft of the second carrier 15 constitute the single three-axis planetary gear device.

When the first ring double-sided gear 2 and the second ring double-sided gear 12 are simultaneously braked, the first sun gear shaft 34 and the shaft of the first carrier 5 are each a kind of reduction gear, and the fourth differential side bevel gear shaft 104, the fourth sun carrier shaft 84, and the shaft of the second carrier 15 constitute the single three-axis planetary gear device.

FIGS. 11 and 12 are views illustrating a nine-axis planetary gear device according to the present invention that is a modification by applying the configurations in FIGS. 7 and 8.

The nine-axis planetary gear device illustrated in FIGS. 11 and 12 is made by additionally installing the fifth sun carrier shaft 114, the fifth sun pinion 117, the fifth sun protrusion shaft 118, the fifth differential side bevel gear 119, the third differential side double-sided bevel gear 80, the sixth sun carrier shaft 124, the sixth sun pinion 127, the sixth sun protrusion shaft 128, the sixth differential side bevel gear 129, and the fourth differential side double-sided bevel gear 90, which are illustrated in FIGS. 11 and 12, in the apparatus illustrated in FIGS. 7 and 8. Theoretically, it is possible to continuously increase the number of shafts by repeating this method.

Nine shafts, which are connected to one another and operated in the apparatus, are provided as the shaft of the first carrier 5, the shaft of the second carrier 15, the shaft of the ring 6, the third sun carrier shaft 74, the fourth sun carrier shaft 84, the fifth sun carrier shaft 114, the sixth sun carrier shaft 124, the fifth differential side bevel gear shaft 134, and the sixth differential side bevel gear shaft 144. A hollow shaft may be made and used for the ring 6, or the ring 6 may be used through external direct contact without a hollow shaft. Therefore, the shaft is not illustrated.

It can be seen that the apparatus in FIGS. 11 and 12 includes seven planetary gear devices.

Two planetary gear devices are provided which include a planetary gear device in which the first sun double-sided gear 1, the first planet gear 3, and the first ring double-sided gear 2 are respectively used as a sun gear, a planet gear, and a ring gear, and a planetary gear device in which the second sun double-sided gear 11, the second planet gear 13, and the second ring double-sided gear 12 are respectively used as a sun gear, a planet gear, and a ring gear. Further, five differential gear devices are provided which include a sun differential gear device in which the first sun double-sided gear 1 and the third differential side double-sided bevel gear 80 are used as differential side gears, the third sun pinion 77 is used as a differential pinion, and the third sun carrier shaft 74 is used as a differential carrier, a sun differential gear device in which the second sun double-sided gear 11 and the fourth differential side double-sided bevel gear 90 are used as differential side gears, the fourth sun pinion 87 is used as a differential pinion, and the fourth sun carrier shaft 84 is used as a differential carrier, a sun differential gear device in which the third differential side double-sided bevel gear 80 and the fifth differential side bevel gear 119 are used as differential side gears, the fifth sun pinion 117 is used as a differential pinion, and the fifth sun carrier shaft 114 is used as a differential carrier, a sun differential gear device in which the fourth differential side double-sided bevel gear 90 and the sixth differential side bevel gear 129 are used as differential side gears, the sixth sun pinion 127 is used as a differential pinion, and the sixth sun carrier shaft 124 is used as a differential carrier, and a ring differential gear device in which the first ring double-sided gear 2 and the second ring double-sided gear 12 are used as differential side gears, the ring pinion 9 is used as a differential pinion, and the ring 6 is used as a differential carrier.

This configuration is identical to the configuration in which the sun differential gear device, in which the fifth sun pinion 117 is used as the differential pinion, and the sun differential gear device, in which the sixth sun pinion 127 is used as the differential pinion, are further included in the seven-axis planetary gear device illustrated in FIGS. 7 and 8, any one differential side gear of the sun differential gear device, in which the fifth sun pinion 117 is used as the differential pinion, and any one differential side gear of the sun differential gear device, in which the third sun pinion 77 is used as the differential pinion, are integrated and constitute the third differential side double-sided bevel gear 80, and any one differential side gear of the sun differential gear device, in which the sixth sun pinion 127 is used as the differential pinion, and any one differential side gear of the sun differential gear device, in which the fourth sun pinion 87 is used as the differential pinion, are integrated and constitute the fourth differential side double-sided bevel gear 90.

It can be seen that in case that any one of the nine shafts is configured as an output shaft, and the remaining shafts are configured as input shafts, very various gear shift ratios may be obtained from the nine-axis planetary gear device by selecting an operation of transmitting a rotational force to the input shafts or braking the input shafts. However, the number of output shafts is not limited to one. Further, one shaft may be configured as an output shaft or an input shaft. The rotational forces may be merged or distributed between the plurality of shafts. In addition, any one of or both the first ring double-sided gear 2 and the second ring double-sided gear 12 are braked, the planetary gear device including the fifth differential side bevel gear shaft 134 and the planetary gear device including the sixth differential side bevel gear shaft 144 are separated from each other and operated independently.

For example, when the first ring double-sided gear 2 is braked, the shaft of the first carrier 5, the third sun carrier shaft 74, the fifth sun carrier shaft 114, and the fifth differential side bevel gear shaft 134 constitute the single four-axis planetary gear device, and the shaft of the ring 6, the shaft of the second carrier 15, the fourth sun carrier shaft 84, the sixth sun carrier shaft 124, and the sixth differential side bevel gear shaft 144 constitute the single five-axis planetary gear device. When the first ring double-sided gear 2 and the second ring double-sided gear 12 are simultaneously braked, the two four-axis planetary gear devices are implemented.

FIG. 13 illustrates a modification of FIGS. 3 and 4. A five-axis planetary gear device illustrated in FIG. 13 further uses the rings 41r, 15r, 5r, and 31r and the circular plate-shaped wheels 41w, 15w, 5w, and 31w to install the brake on the shaft, the gear connected to the shaft, or the part connected to the gear. The brake may be easily installed by means of a ring or a part exposed to the outside, and thus the braking may be easily performed when the parts need not be rotated.

The hollow shafts 6s, 15s, and 44 and the circular plate-shaped discs 5d, 6d, and 15d are further used to install the wheels and the rings. Among the five shafts 5s, 6s, 15s, 34, and 44, the four shafts 5s, 6s, 15s, and 44 are disposed at the left side, and one shaft 34 is disposed at the right side. The discs 5d, 6d, and 15d are respectively attached to some of the shafts 5s, 6s, and 15s, and the carriers 5 and 15 or the ring protrusion shaft 10 attached to the discs 5d, 6d, and 15d. With reference to FIG. 15, it can be seen that the arrangements of the shafts at the left and right sides may vary, as necessary, without being limited to the arrangement in FIG. 13.

The component, which is required to be braked, is not limited to the shaft. The brake may be easily installed because the first ring double-sided gear 2 and the second ring double-sided gear 12 are exposed to the outside. The planetary gear device including the first sun gear shaft 34 and the planetary gear device including the second sun gear shaft 44 may be separated from each other and operated independently by braking the first ring double-sided gear 2 and the second ring double-sided gear 12.

The number and installation of the discs, wheels, and rings are not limited, and the discs, wheels, and rings may be installed, as necessary.

In the five-axis planetary gear device illustrated in FIG. 13, the first carrier shaft 5s and the first sun gear shaft 34 need not be configured as hollow shafts. However, the hollow shaft may be required in case that the separate planetary gear device is present at the right side of the apparatus, and the shafts need to be connected from the left side of the apparatus. In case that the first carrier shaft 5s extends toward the right side, only the first sun gear shaft 34 may be configured as a hollow shaft.

Five shafts, which are connected to one another and operated in the apparatus, are provided as the first carrier shaft 5s, the second carrier shaft 15s, the ring carrier shaft 6s, the first sun gear shaft 34, and the second sun gear shaft 44.

It can be seen that the apparatus in FIG. 13 includes three planetary gear devices, like the apparatus in FIGS. 3 and 4. The descriptions in FIGS. 3 and 4 show the configurations and integration of the planetary gear devices.

FIG. 14 illustrates a modification of FIG. 13. The four-axis planetary gear device is implemented by removing some components 6, 10, 9, 6d, 6s, 2, and 12 in FIG. 13 and additionally installing the ring double-sided gear 152.

The brake may be easily installed because the ring double-sided gear 152 is exposed to the outside. The planetary gear device including the first sun gear shaft 34 and the planetary gear device including the second sun gear shaft 44 may be separated from each other and operated independently by braking the ring double-sided gear 152.

The number and installation of the discs, wheels, and rings are not limited, and the discs, wheels, and rings may be installed, as necessary.

Four shafts, which are connected to one another and operated in the apparatus, are provided as the first carrier shaft 5s, the second carrier shaft 15s, the first sun gear shaft 34, and the second sun gear shaft 44.

FIG. 15 illustrates a modification of FIG. 14. In FIG. 14, some shafts 5s are moved and disposed at the right side. This illustrates that the shaft may be moved and disposed, as necessary.

The number and installation of the discs, wheels, and rings are not limited, and the discs, wheels, and rings may be installed, as necessary.

Four shafts, which are connected to one another and operated in the apparatus, are provided as the first carrier shaft 5s, the second carrier shaft 15s, the first sun gear shaft 34, and the second sun gear shaft 44.

It can be seen that the apparatus in FIGS. 14 and 15 includes two planetary gear devices.

Two planetary gear devices are provided which include a planetary gear device in which the first sun gear 31, the first planet gear 3, the ring double-sided gear 152, and the first carrier 5 are respectively used as a sun gear, a planet gear, a ring gear, and a carrier, and a planetary gear device in which the second sun gear 41, the second planet gear 13, the ring double-sided gear 152, and the second carrier 15 are respectively used as a sun gear, a planet gear, a ring gear, and a carrier. Further, there are the disc, the wheel, and the ring.

The ring double-sided gear 152 is configured by integrating the ring gears used for the two planetary gear devices and constitutes connection the two planetary gear devices. In other words, the two ring gears of the two planetary gear devices are integrated into a single configuration. Further, the disc is installed between the carrier shaft and the two carriers of the two planetary gear devices, and the wheel and the ring are installed with respect to the two carriers and the shafts of the two sun gears.

FIG. 16 illustrates a modification of FIGS. 7 and 8. A seven-axis planetary gear device illustrated in FIG. 16 further uses the rings 5r, 15r, 74r, 84r, 94r, and 104r and the circular plate-shaped wheels 5w, 15w, 74w, 84w, 94w, and 104w to install the brake on the shaft, the gear connected to the shaft, or the part connected to the gear. The brake may be easily installed by means of a part exposed to the outside, and thus the braking may be easily performed when the parts need not be rotated.

The hollow shafts 5s, 6s, 15s, 84s, and 104, the circular plate-shaped discs 5d, 6d, 15d, 74d, and 84d, and the cylindrical cylinders 5c, 15c, 74c, and 84c are further used to install the wheels and the rings. Among the seven shafts 5s, 6s, 15s, 74s, 84s, 94, and 104, the six shafts 5s, 6s, 15s, 74s, 84s, and 104 are disposed at the left side, and one shaft 94 is disposed at the right side. The discs 5d, 6d, 15d, 74d, and 84d are respectively attached to some of the shafts 5s, 6s, 15s, 74s, and 84s, the cylinders 5c, 15c, 74c, and 84c or the ring protrusion shaft 10 is attached to the discs 5d, 6d, 15d, 74d, and 84d, and the carriers 5 and 15 or the sun protrusion shafts 78 and 88 are attached to the cylinders 5c, 15c, 74c, and 84c. The arrangements of the shafts at the left and right sides may vary, as necessary, without being limited to the arrangement in FIG. 16.

The component, which is required to be braked, is not limited to the shaft. The brake may be easily installed because the first ring double-sided gear 2 and the second ring double-sided gear 12 are exposed to the outside. The planetary gear device including the first carrier shaft 5s and the planetary gear device including the second carrier shaft 15s may be separated from each other and operated independently by braking the first ring double-sided gear 2 and the second ring double-sided gear 12.

The number and installation of the discs, wheels, and rings are not limited, and the discs, wheels, and rings may be installed, as necessary.

Seven shafts, which are connected to one another and operated in the apparatus, are provided as the first carrier shaft 5s, the second carrier shaft 15s, the ring carrier shaft 6s, the third sun carrier shaft driving shaft 74s, the fourth sun carrier shaft driving shaft 84s, the third differential side bevel gear shaft 94, and the fourth differential side bevel gear shaft 104.

It can be seen that the apparatus in FIG. 16 includes five planetary gear devices, like the apparatus in FIGS. 7 and 8. The descriptions in FIGS. 7 and 8 show the configurations and integration of the planetary gear devices.

FIG. 17 illustrates a modification of FIGS. 9 and 10. A six-axis planetary gear device illustrated in FIG. 17 further uses the rings 5r, 15r, 31r, 84r, and 104r) the circular plate-shaped wheels 5w, 15w, 31w, 84w, and 104w to install the brake on the shaft, the gear connected to the shaft, or the part connected to the gear. The brake may be easily installed by means of a part exposed to the outside, and thus the braking may be easily performed when the parts need not be rotated.

The hollow shafts 6s, 15s, 84s, and 104, the circular plate-shaped discs 5d, 6d, 15d, and 84d, and the cylindrical cylinders 5c, 15c, and 84c are further used to install the wheels and the rings. Among the six shafts 5s, 6s, 15s, 84s, 34, and 104, the five shafts 5s, 6s, 15s, 84s, and 104 are disposed at the left side, and one shaft 34 is disposed at the right side. The discs 5d, 6d, 15d, and 84d are respectively attached to some of the shafts 5s, 6s, 15s, and 84s, the cylinders 5c, 15c, and 84c or the ring protrusion shaft 10 is attached to the discs 5d, 6d, 15d, and 84d, and the carriers 5 and 15 or the sun protrusion shaft 88 is attached to the cylinders 5c, 15c, and 84c. The arrangements of the shafts at the left and right sides may vary, as necessary, without being limited to the arrangement in FIG. 17.

The component, which is required to be braked, is not limited to the shaft. The brake may be easily installed because the first ring double-sided gear 2 and the second ring double-sided gear 12 are exposed to the outside. The planetary gear device including the first carrier shaft 5s and the planetary gear device including the second carrier shaft 15s may be separated from each other and operated independently by braking the first ring double-sided gear 2 and the second ring double-sided gear 12.

The number and installation of the discs, wheels, and rings are not limited, and the discs, wheels, and rings may be installed, as necessary.

Six shafts, which are connected to one another and operated in the apparatus, are provided as the first carrier shaft 5s, the second carrier shaft 15s, the ring carrier shaft 6s, the first sun gear shaft 34, the fourth sun carrier shaft driving shaft 84s, and the fourth differential side bevel gear shaft 104.

It can be seen that the apparatus in FIG. 17 includes four planetary gear devices, like the apparatus in FIGS. 9 and 10. The descriptions in FIGS. 9 and 10 show the configurations and integration of the planetary gear devices.

FIG. 18 is a view illustrating an eight-axis planetary gear device according to the present invention that is a modification by applying the configurations in FIGS. 7 and 8.

The eight-axis planetary gear device in FIG. 18 is configured by additionally installing the sixth sun carrier shaft 124, the sixth sun pinion 127, the sixth sun protrusion shaft 128, the fourth differential side double-sided bevel gear 90, the sixth differential side bevel gear 129, and the sixth differential side bevel gear shaft 144, which are illustrated in FIGS. 11 and 12, in the apparatus illustrated in FIGS. 7 and 8. The apparatus is configured by additionally installing the fifth sun carrier shaft 114, the fifth sun pinion 117, the fifth sun protrusion shaft 118, the third differential side double-sided bevel gear 80, the fifth differential side bevel gear 119, and the fifth differential side bevel gear shaft 134, which are illustrated in FIGS. 11 and 12, in the apparatus illustrated in FIGS. 7 and 8. Because the apparatus illustrated in FIGS. 7 and 8 is vertically symmetric, the result is the same even though any one of the two methods is selected.

Eight shafts, which are connected to one another and operated in the apparatus, are provided as the shaft of the first carrier 5, the shaft of the second carrier 15, the shaft of the ring 6, the third sun carrier shaft 74, the fourth sun carrier shaft 84, the third differential side bevel gear shaft 94, the sixth sun carrier shaft 124, and the sixth differential side bevel gear shaft 144. A hollow shaft may be made and used for the ring 6.

This configuration is identical to the configuration in which the sun differential gear device, in which the fourth differential side double-sided bevel gear 90 and the sixth differential side bevel gear 129 are used for the differential side gear, the sixth sun pinion 127 is used for the differential pinion, and the sixth sun carrier shaft 124 is used for the differential carrier, is further included in the seven-axis planetary gear device illustrated in FIGS. 7 and 8, and any one differential side gear 90 of the two differential side gears 90 and 129 of the sun differential gear device, in which the sixth sun pinion 127 is used as the differential pinion, and any one differential side gear 89 of the two differential side gears 11 and 89 of the sun differential gear device, in which the fourth sun pinion 87 is used as the differential pinion, are integrated and constitute the fourth differential side double-sided bevel gear 90.

FIG. 19 illustrates a modification of FIGS. 11 and 12. A nine-axis planetary gear device illustrated in FIG. 19 further uses the rings 5r, 15r, 74r, 84r, 114r, 124r, 134r, and 144r and the circular plate-shaped wheels 5w, 15w, 74w, 84w, 114w, 124w, 134w, and 144w to install the brake on the shaft, the gear connected to the shaft, or the part connected to the gear. The brake may be easily installed by means of a part exposed to the outside, and thus the braking may be easily performed when the parts need not be rotated.

The hollow shafts 15s, 74s, 84s, 114s, 124s, 134, and 144, the circular plate-shaped discs 5d, 6d, 15d, 74d, 84d, 114d, and 124d, and the cylindrical cylinders 5c, 15c, 74c, 84c, 114c, and 124c are further used to install the wheels and the rings. Among the nine shafts 5s, 6s, 15s, 74s, 84s, 114s, 124s, 134, and 144, the five shafts 6s, 15s, 84s, 124s, and 144 are disposed at the left side, and the four shafts 5s, 74s, 114s, and 134 are disposed at the right side. The discs 5d, 6d, 74d, 84d, 114d, and 124d are respectively attached to some of the shafts 5s, 6s, 15s, 74s, 84s, 114s, and 124s, the cylinders 5c, 15c, 74c, 84c, 114c, and 124c or the ring protrusion shaft 10 is attached to the discs 5d, 6d, 15d, 74d, 84d, 114d, and 124d, and the carriers 5 and 15 or the sun protrusion shafts 78, 88, 118, and 128 are attached to the cylinders 5c, 15c, 74c, 84c, 114c, and 124c. The arrangements of the shafts at the left and right sides may vary, as necessary, without being limited to the arrangement in FIG. 19.

The component, which is required to be braked, is not limited to the shaft. The brake may be easily installed because the first ring double-sided gear 2 and the second ring double-sided gear 12 are exposed to the outside. The planetary gear device including the first carrier shaft 5s and the planetary gear device including the second carrier shaft 15s may be separated from each other and operated independently by braking the first ring double-sided gear 2 and the second ring double-sided gear 12.

The number and installation of the discs, wheels, and rings are not limited, and the discs, wheels, and rings may be installed, as necessary.

Nine shafts, which are connected to one another and operated in the apparatus, are provided as the first carrier shaft 5s, the second carrier shaft 15s, the ring carrier shaft 6s, the third sun carrier shaft driving shaft 74s, the fourth sun carrier shaft driving shaft 84s, the fifth sun carrier shaft driving shaft 114s, the sixth sun carrier shaft driving shaft 124s, the fifth differential side bevel gear shaft 134, and the sixth differential side bevel gear shaft 144.

FIG. 20 illustrates a modification of FIG. 18. An eight-axis planetary gear device illustrated in FIG. 20 further uses the rings 5r, 15r, 74r, 84r, 94r, 124r, and 144r and the circular plate-shaped wheels 5w, 15w, 74w, 84w, 94w, 124w, and 144w to install the brake on the shaft, the gear connected to the shaft, or the part connected to the gear. The brake may be easily installed by means of a part exposed to the outside, and thus the braking may be easily performed when the parts need not be rotated.

The hollow shafts 15s, 74s, 84s, 94, 124s, and 144, the circular plate-shaped discs 5d, 6d, 15d, 74d, 84d, and 124d, and the cylindrical cylinders 5c, 15c, 74c, 84c, and 124c are further used to install the wheels and the rings. Among the eight shafts 5s, 6s, 15s, 74s, 84s, 94, 124s, and 144, the five shafts 6s, 15s, 84s, 124s, and 144 are disposed at the left side, and the three shafts 5s, 74s, and 94 are disposed at the right side. The discs 5d, 6d, 15d, 74d, 84d, and 124d are respectively attached to some of the shafts 5s, 6s, 15s, 74s, 84s, and 124s, the cylinders 5c, 15c, 74c, 84c, and 124c or the ring protrusion shaft 10 is attached to the discs 5d, 6d, 15d, 74d, 84d, and 124d, and the carriers 5 and 15 or the sun protrusion shafts 78, 88, and 128 are attached to the cylinders 5c, 15c, 74c, 84c, and 124c. The arrangements of the shafts at the left and right sides may vary, as necessary, without being limited to the arrangement in FIG. 20.

The component, which is required to be braked, is not limited to the shaft. The brake may be easily installed because the first ring double-sided gear 2 and the second ring double-sided gear 12 are exposed to the outside. The planetary gear device including the first carrier shaft 5s and the planetary gear device including the second carrier shaft 15s may be separated from each other and operated independently by braking the first ring double-sided gear 2 and the second ring double-sided gear 12.

The number and installation of the discs, wheels, and rings are not limited, and the discs, wheels, and rings may be installed, as necessary.

Eight shafts, which are connected to one another and operated in the apparatus, are provided as the first carrier shaft 5s, the second carrier shaft 15s, the ring carrier shaft 6s, the third sun carrier shaft driving shaft 74s, the fourth sun carrier shaft driving shaft 84s, the third differential side bevel gear shaft 94, the sixth sun carrier shaft driving shaft 124s, and the sixth differential side bevel gear shaft 144.

The planetary gear device according to the present invention may be applied to an automatic transmission. In addition, in the hybrid vehicle or the like, the planetary gear device may be used to connect the plurality of power supplying devices and the plurality of power receiving devices, brake some of the connected devices, or divide the connected devices into two groups and separate the connected devices. Further, the planetary gear device may be used to integrate the devices and the transmission into a single configuration.

The planetary gear device may be used for the apparatus that merges, distributes, or separates the rotational forces by connecting the plurality of shafts.

The invention claimed is:

1. A planetary gear device comprising:
a first planetary gear device comprising a first sun gear installed on a first sun gear shaft, a plurality of first planet gears installed on a first carrier, and a first ring double-sided gear;
a second planetary gear device comprising a second sun gear installed on a second sun gear shaft, a plurality of second planet gears installed on a second carrier, and a second ring double-sided gear; and
a ring differential gear device comprising the first ring double-sided gear and the second ring double-sided gear configured as differential side gears, a first ring configured as a differential carrier, and a plurality of ring pinions installed on a plurality of ring protrusion shafts and configured as differential pinions,
wherein
a disc and a shaft are connected to at least one of the first ring, the first carrier, and the second carrier, such that
the first ring is connected to a first ring disc and a first ring carrier shaft,
the first carrier is connected to a first carrier disc and a first carrier shaft, and
the second carrier is connected to a second carrier disc and a second carrier shaft,
wherein a center line is formed with respect to the first sun gear shaft, the second sun gear shaft, the first carrier shaft, the second carrier shaft, and the first ring carrier shaft, and
the first sun gear shaft, the second sun gear shaft, the first carrier shaft, the second carrier shaft, and the first ring carrier shaft are connected to one another.

2. A planetary gear device comprising:
a first planetary gear device comprising a first sun gear installed on a first sun gear shaft, a plurality of first planet gears installed on a first carrier, and a first ring double-sided gear;
a second planetary gear device comprising a first sun double-sided gear spinning on a first sun carrier shaft which is spinning on a first differential side bevel gear shaft, a plurality of second planet gears installed on a second carrier, and a second ring double-sided gear;
a ring differential gear device comprising the first ring double-sided gear and the second ring double-sided gear configured as differential side gears, a first ring configured as a differential carrier, and a plurality of ring pinions installed on a plurality of ring protrusion shafts and configured as differential pinions, and
a first sun differential gear device comprising a first differential side bevel gear installed at the first differential side bevel gear shaft and the first sun double-sided gear, configured as differential side gears, the first sun carrier shaft configured as a differential carrier, and a plurality of first sun pinions installed on a plurality of first sun protrusion shafts and configured as differential pinions,
wherein
a disc, a shaft, and a cylinder are connected to at least one of the first ring, the first carrier, the second carrier, and the first sun carrier shaft, such that
the first ring is connected to a first ring disc and a first ring carrier shaft,
the first carrier is connected to a first carrier disc and a first carrier shaft,
the second carrier is connected to a first carrier cylinder, a second carrier disc, and a second carrier shaft, and
the first sun carrier shaft is connected to a first sun carrier shaft cylinder, a first sun carrier shaft disc, and a first sun carrier shaft driving shaft,
wherein a center line is formed with respect to the first sun gear shaft, the first differential side bevel gear shaft, the first sun carrier shaft driving shaft, the first carrier shaft, the second carrier shaft, and the first ring carrier shaft, and
the first sun gear shaft, the first differential side bevel gear shaft, the first sun carrier shaft driving shaft, the first carrier shaft, the second carrier shaft, and the first ring carrier shaft are connected to one another.

3. A planetary gear device comprising:
a first planetary gear device comprising a first sun double-sided gear that spins on a first sun carrier shaft that spins on a first differential side bevel gear shaft, a plurality of first planet gears installed on a first carrier, and a first ring double-sided gear;
a second planetary gear device comprising a second sun double-sided gear spinning on a second sun carrier shaft which is spinning on a second differential side bevel gear shaft, a plurality of second planet gears installed on a second carrier, and a second ring double-sided gear;
a ring differential gear device comprising the first ring double-sided gear and the second ring double-sided gear configured as differential side gears, a first ring configured as a differential carrier, and a plurality of ring pinions installed on a plurality of ring protrusion shafts and configured as differential pinions,
a first sun differential gear device comprising a first differential side bevel gear installed at the first differential side bevel gear shaft and the first sun double-sided gear, configured as differential side gears, the first sun carrier shaft configured as a differential carrier, and a plurality of first sun pinions installed on a plurality of first sun protrusion shafts and configured as differential pinions, and
a second sun differential gear device comprising a second differential side bevel gear installed at the second differential side bevel gear shaft and the second sun double-sided gear, configured as differential side gears, the second sun carrier shaft configured as a differential carrier, and a plurality of second sun pinions installed on a plurality of second sun protrusion shafts and configured as differential pinions, wherein a disc, a shaft, and a cylinder are connected to at least one of the first ring, the first carrier, the second carrier, the first sun carrier shaft, and the second sun carrier shaft, such that the first ring is connected to a first ring disc and a first ring carrier shaft, the first carrier is connected to a first carrier cylinder, a first carrier disc, and a first carrier shaft, the second carrier is connected to a second carrier cylinder, a second carrier disc, and a second carrier shaft, the first sun carrier shaft is connected to a first sun carrier shaft cylinder, a first sun carrier shaft disc, and a first sun carrier shaft driving shaft, and the second sun carrier shaft is connected to a second sun carrier shaft cylinder, a second sun carrier shaft disc, and a second sun carrier shaft driving shaft, wherein a center line is formed with respect to the first differential side bevel gear shaft, the second differential side bevel gear shaft, the first sun carrier shaft driving shaft, the second sun carrier shaft driving shaft, the first carrier shaft, the second carrier shaft, and the first ring carrier shaft, and the first differential side bevel gear shaft, the second differential side bevel gear shaft, the first sun carrier shaft driving shaft, the second sun carrier shaft driving shaft, the first carrier shaft, the second carrier shaft, and the first ring carrier shaft are connected to one another.

4. A planetary gear device comprising:

a first planetary gear device comprising a first sun gear installed on a first sun gear shaft, a plurality of first planet gears installed on a first carrier, and a ring double-sided gear; and a second planetary gear device comprising a second sun gear installed on a second sun gear shaft, a plurality of second planet gears installed on a second carrier, and the ring double-sided gear, wherein a disc and a shaft are connected to at least one of the first carrier and the second carrier, such that the first carrier is connected to a first carrier disc and a first carrier shaft, and the second carrier is connected to a second carrier disc and a second carrier shaft, wherein a center line is formed with respect to the first sun gear shaft, the second sun gear shaft, the first carrier shaft, and the second carrier shaft, and the first sun gear shaft, the second sun gear shaft, the first carrier shaft, and the second carrier shaft are connected to one another, wherein a wheel and a ring are connected to at least one of the first sun gear shaft, the first carrier, the second sun gear shaft, and the second carrier, such that the first sun gear shaft is connected to a first sun gear wheel and a first sun gear ring, the first carrier is connected to a first carrier wheel and a first carrier ring, the second sun gear shaft is connected to a second sun gear wheel and a second sun gear ring, and the second carrier is connected to a second carrier wheel and a second carrier ring, wherein the first sun gear shaft, the second sun gear shaft, the first carrier shaft, and the second carrier shaft are configured to be stopped from the outside, respectively, and the planetary gear device is further configured, by stopping the ring double-sided gear from the outside, to disconnect a connection between the first planetary gear device and the second planetary gear device and to operate each of the first planetary gear device and the second planetary gear device separately.

5. The planetary gear device of claim 1, wherein a wheel and a second ring are connected to at least one of the first sun gear shaft, the first carrier, the second sun gear shaft, and the second carrier, such that the first sun gear shaft is connected to a first sun gear wheel and a first sun gear ring, the first carrier is connected to a first carrier wheel and a first carrier ring, the second sun gear shaft is connected to a second sun gear wheel and a second sun gear ring, and the second carrier is connected to a second carrier wheel and a second carrier ring, wherein the first sun gear shaft, the second sun gear shaft, the first carrier shaft, the second carrier shaft, and the first ring carrier shaft are configured to be stopped from the outside, respectively, and the planetary gear device is further configured, by stopping the first ring double-sided gear or the second ring double-sided gear from the outside, to disconnect a connection between the first planetary gear device and the second planetary gear device and to operate each of the first planetary gear device and the second planetary gear device separately.

6. The planetary gear device of claim 2, wherein a wheel and a second ring are connected to at least one of the first sun gear shaft, the first carrier, the second carrier, the first sun carrier shaft, and the first differential side bevel gear shaft, such that the first sun gear shaft is connected to a first sun gear wheel and a first sun gear ring, the first carrier is connected to a first carrier wheel and a first carrier ring, the second carrier is connected to a second carrier wheel and a second carrier ring, the first sun carrier shaft is connected to a first sun carrier shaft wheel and a first sun carrier shaft ring, and the first differential side bevel gear shaft is connected to a first differential side bevel gear shaft wheel and a first differential side bevel gear shaft ring, wherein the first sun gear shaft, the first differential side bevel gear shaft, the first sun carrier shaft driving shaft, the first carrier shaft, the second carrier shaft, and the first ring carrier shaft are configured to be stopped from the outside, respectively, and the planetary gear device is further configured, by stopping the first ring double-sided gear or the second ring double-sided gear from the outside, to disconnect a connection between the first planetary gear device and the second planetary gear device and to operate each of the first planetary gear device and the second planetary gear device separately.

7. The planetary gear device of claim 3, wherein a wheel and a second ring are connected to at least one of the first carrier, the second carrier, the first sun carrier shaft, the second sun carrier shaft, the first differential side bevel gear shaft, and the second differential side bevel gear shaft, such that the first carrier is connected to a first carrier wheel and a first carrier ring,
the second carrier is connected to a second carrier wheel and a second carrier ring,
the first sun carrier shaft is connected to a first sun carrier shaft wheel and a first sun carrier shaft ring,
the second sun carrier shaft is connected to a second sun carrier shaft wheel and a second sun carrier shaft ring,
the first differential side bevel gear shaft is connected to a first differential side bevel gear shaft wheel and a first differential side bevel gear shaft ring, and
the second differential side bevel gear shaft is connected to a second differential side bevel gear shaft wheel and a second differential side bevel gear shaft ring,
wherein the first differential side bevel gear shaft, the second differential side bevel gear shaft, the first sun carrier shaft driving shaft, the second sun carrier shaft driving shaft, the first carrier shaft, the second carrier shaft, and the first ring carrier shaft are configured to be stopped from the outside, respectively, and
the planetary gear device is further configured, by stopping the first ring double-sided gear or the second ring double-sided gear from the outside, to disconnect a connection between the first planetary gear device and the second planetary gear device and to operate each of the first planetary gear device and the second planetary gear device separately.

\* \* \* \* \*